(12) United States Patent
Yana Motta et al.

(10) Patent No.: US 11,566,155 B2
(45) Date of Patent: Jan. 31, 2023

(54) NONFLAMMABLE REFRIGERANTS HAVING LOW GWP, AND SYSTEMS FOR AND METHODS OF PROVIDING REFRIGERATION

(71) Applicant: HONEYWELL INTERNATIONAL INC., Charlotte, NC (US)

(72) Inventors: Samuel F. Yana Motta, Charlotte, NC (US); Ryan Hulse, Charlotte, NC (US); Joshua Close, Charlotte, NC (US); Ankit Sethi, Charlotte, NC (US); Gustavo Pottker, Charlotte, NC (US)

(73) Assignee: HONEYWELL INTERNATIONAL. INC., Charlotte, NC (US)

( * ) Notice: Subject to any disclaimer, the term of this patent is extended or adjusted under 35 U.S.C. 154(b) by 0 days.

(21) Appl. No.: 17/499,198

(22) Filed: Oct. 12, 2021

(65) Prior Publication Data
US 2022/0135859 A1 May 5, 2022

Related U.S. Application Data

(62) Division of application No. 16/690,030, filed on Nov. 20, 2019, now Pat. No. 11,155,737.

(60) Provisional application No. 62/770,522, filed on Nov. 21, 2018.

(51) Int. Cl.
*C09K 5/04* (2006.01)
*F25B 7/00* (2006.01)
*F25B 39/02* (2006.01)

(52) U.S. Cl.
CPC ............ *C09K 5/045* (2013.01); *F25B 7/00* (2013.01); *F25B 39/02* (2013.01); *F25B 2400/22* (2013.01)

(58) Field of Classification Search
CPC .............. C09K 5/045; C09K 2205/126; C09K 2205/22; F25B 7/00; F25B 39/02; F25B 2400/22; F25B 9/002
USPC ................. 252/67, 68, 69; 62/529, 531, 467
See application file for complete search history.

(56) References Cited

U.S. PATENT DOCUMENTS

| | | | |
|---|---|---|---|
| 9,902,888 B2 * | 2/2018 | Leck | F25B 39/00 |
| 11,155,737 B2 * | 10/2021 | Yana Motta | F25B 7/00 |
| 2010/0127208 A1 * | 5/2010 | Nappa | F25B 1/00 252/67 |
| 2016/0068731 A1 * | 3/2016 | Minor | C10M 111/02 62/529 |
| 2018/0264303 A1 * | 9/2018 | Robin | A62D 1/0092 |
| 2021/0122962 A1 * | 4/2021 | Allgood | C09K 5/045 |

OTHER PUBLICATIONS

International Search Report, PCT/US/062560, 3 pages, dated Mar. 17, 2020. (Year: 2020).*
CAS reg. No. 431-89-0, Nov. 16, 1984. (Year: 1984).*
CAS reg. No. 29118-24-9, Nov. 16, 1984. (Year: 1984).*
CAS reg. No. 66711-86-2, Nov. 16, 1984. (Year: 1984).*

* cited by examiner

*Primary Examiner* — Douglas J Mc Ginty
(74) *Attorney, Agent, or Firm* — Colleen D. Szuch

(57) ABSTRACT

The present invention provides a refrigerant composition comprising: (a) from about 65% by weight to about 90% by weight of HFO-1234ze(E); (b) from about 10% by weight to about 35% by weight of HFO-1336mzz (E); and optionally (c) from about 0% to about 4.4% by weight of HFC-227ea for use in a variety of refrigeration applications, including air conditioning and/or refrigeration and particularly cooling products such as fruits, vegetables and beverages without exposing those articles to temperatures below the freezing point of water.

20 Claims, 4 Drawing Sheets

NONFLAMMABLE REFRIGERANTS HAVING LOW GWP, AND SYSTEMS FOR AND METHODS OF PROVIDING REFRIGERATION

CROSS REFERENCE TO RELATED APPLICATIONS

The present application is a divisional of U.S. patent application Ser. No. 16/690,030, filed Nov. 20, 2019 which is related to and claims the priority benefit of U.S. Provisional Application No. 62/770,522 filed Nov. 21, 2018, which is incorporated herein by reference in its entirety.

FIELD OF THE INVENTION

The present invention relates to high efficiency, low-global warming potential ("low GWP") refrigerants and to air conditioning and/or refrigeration systems and methods for providing cooling that are safe and effective, and particularly to systems and methods for cooling of articles (such as fruits, vegetables and water) without exposing those articles to temperatures below the freezing point of water.

BACKGROUND

In certain refrigeration applications, it is necessary to cool articles but without exposing those articles to temperatures below a certain temperature, such as the freezing point of water. For example, it is common in a supermarket environment to keep certain produce at a reduced temperature relative to the ambient, but at the same time it is disadvantageous to cool that produce below the freezing point of water, especially since the preferred method of cooling involves indirect cooling with humid, ambient air. For these applications, it is also disadvantageous to have, along the evaporator, refrigerant temperatures below freezing point of water, as they will cause frost accumulation and consequently the need to defrost the equipment. Avoiding frost accumulation is an important aspect in those applications. Similarly, cooling of beverages, including water and the like, should also be conducted under conditions which avoid exposing such products to temperatures below the freezing point of water since freezing of such products is not desirable at the point of sale. For the purpose of convenience, applicants will refer herein to such applications, methods and systems as "no-freeze" applications, methods and systems.

Certain single-component fluorocarbons, including chlorofluorocarbons ("CFCs"), hydrochlorofluorocarbons ("HCFCs"), and hydrofluoroolefins ("HFOs"), have been used in "no frost" applications in which the refrigerant temperature along the evaporator must remain above the freezing point of water so that frost does not accumulate on the coil surface and, consequently, defrost is not required In such refrigeration applications, systems and methods, the use of single component fluids has heretofore been considered particularly desirable because the saturation temperature of such fluids does not change upon evaporation of the fluid at constant pressure. This is highly desirable because it permits the system or method to be designed with a refrigerant temperature along the evaporator that remains essentially constant during the evaporation processes, and above the freezing temperature of water, assuming little or no pressure drop as the refrigerant flows through the evaporator. In addition, produce applications also typically require small temperature difference between air and refrigerant to reduce the dehumidification of the air and consequent removal of moisture content and loss of quality of the produce. The requirements of small temperature differences and avoiding frost formation combined with the need for the evaporator to have a certain positive degree of superheat at the exit are critical in selecting a specific refrigerant. A degree of superheat equal or below zero, i.e. refrigerant is not superheated, may lead to reduction in cooling capacity, efficiency and potential compressor failure. The term "degree of superheat" or simply "superheat" means the temperature rise of the refrigerant at the exit of the evaporator above the saturated vapor temperature (or dew temperature) of the refrigerant.

This is illustrated, by way of example in FIG. 1, which represents in schematic form a typical supermarket produce cooling case. Typically, as illustrated in FIG. 1, cooled, moisture-bearing air is provided to the product display zone of the display case by passing air, both from outside of the case 102 and from recirculating air 104, over the heat exchange surface of an evaporator coil 106 disposed within the display case in a region which is typically separate from (or at least hidden from the view of the consumer) but near to the product display zone. The evaporator 106 has a single component refrigerant inlet 108 and a single component refrigerant outlet 110. A circulating fan 114 is also used. It is highly desirable in systems of the type illustrated above that the cooled space 112 in the refrigeration system has a refrigerant temperature along the evaporator that always or substantially always is above a certain level. For example, in many applications such as refrigeration of produce, the minimum discharge (exit) temperature of the air in the display case is set by design to be about 2° C. to 3° C. in order to provide a margin of safety for avoidance of having a cooled space or cooled article that is below the freezing point of water. In addition, in order to minimize the removal of moisture from the air and consequent drying of produce (loss of quality), the temperature difference between air exit and refrigerant needs to be small, typically 2° C. to 3° C. This, combined with the fact that the evaporator of these applications requires a degree of superheat of about 3 to about 5° C., will impose a constraint on the allowable evaporator glide of the refrigerant so that the evaporation temperature remains above the freezing point of water and, as a result, frost does not accumulate. This is illustrated in FIGS. 2 and 3.

As an example in FIG. 2, it can be seen that when the air discharge temperature is 3° C., a maximum evaporator glide of 3° C. (Refrigerant A) is allowed and if a refrigerant has an evaporator glide greater than 3° C., e.g. 4° C. for Refrigerant B, the refrigerant temperature goes below the freezing point of water and frost may accumulate.

In FIG. 3, the air discharge temperature is 2° C., which limits the evaporator glide to about 2° C. (Refrigerant C), and if a refrigerant has an evaporator glide greater than 2° C., e.g. 3° C. for Refrigerant D, the refrigerant temperatures reach below freezing and frost may accumulate. In summary, a glide smaller than 4.5° C. is preferred and a glide lower than 3° C. is more preferred, and a glide of lower than 2° C. is most preferred to avoid frost accumulation in those applications.

Those skilled in the art will appreciate that these two desirable results have heretofore been frequently very difficult to provide with refrigerants that are multi-component blends of different single component refrigerants.

Prior to the present invention, those skilled in the art have utilized mainly single component refrigerants, such as HFC-134a, in such applications having low temperature sensitivity, as discussed above, and avoided refrigerant blends because blends generally undergo a significant change in boiling point temperature upon evaporation, which has heretofore been perceived as a major obstacle to the ability to identify blends having the correct balance of properties to be useful in such systems.

On the other hand, Applicants have come to appreciate that it is also difficult in many applications to identify a single-component fluid that possesses the full set of properties that make it of particular advantage in applications of the type discussed above. For example, in many important applications, it is necessary to identify a refrigerant that simultaneously: (1) has workable glide, i.e. a glide of less than 4.5° C., preferably below about 3° C., and even more preferably below about 2° C. to avoid frost formation and be able to maintain a typical degree of superheat, e.g. about 3° C. to about 5° C.; (2) is non-flammable; (3) has low or no substantial toxicity; (4) has low global warming potential (GWP) (e.g., less than about 150, and even more preferably less than about 75), and (5) has heat transfer and other properties (such as chemical stability) that match the needs of the particular applications especially in medium temperature heat transfer systems and even more preferably in no-frost or low-frost medium temperature refrigeration systems. While the use of single component refrigerants has been able in many cases to satisfy items (1) (2), and (3), those skilled in the art have found it difficult (if not impossible) to heretofore find a refrigerant (whether single component or otherwise) that can satisfy not only items (1), (2), and (3) but most of and preferably all of items (4)-(5). Here a non-flammable substance would be classified as class "1" by ASHRAE and a low toxicity substance is classified as class "A" by ASHRAE Standard 34-2016. A substance which is non-flammable and low-toxicity would be classified as "A1" by ASHRAE Standard 34-2016.

For example, while HFC-134a has heretofore been used for certain no-freeze applications, it nevertheless fails to satisfy, for example, the low GWP requirement (item 5 above), as HFC-134a has a GWP of about 1300.

Applicants proceeded in a manner contrary to the accepted wisdom and discovered unexpected and advantageous results. For example, Applicants have found, as described in detail hereinafter, that certain blends comprising a carefully selected combination of components can have an advantageous but unexpected combination of non-flammability while at the same time having excellent heat transfer properties, low GWP (e.g. a GWP of less than about 150), low- or no-toxicity, chemical stability, and lubricant compatibility, among others. Furthermore, Applicants have found that the refrigerant compositions of the present invention have particular advantage for use in medium temperature refrigeration systems, and particularly in medium temperature refrigeration systems in which it is desired to maintain the cooled-air temperature above about 0° C., and to avoid exposing the air being cooled to temperatures below about 0° C., in order to protect the articles being cooled from frost and/or to prevent frosting of the evaporator coils, which itself may have a negative impact on the overall efficiency of such systems due to the need for defrosting and/or inconsistent cooling across the coils.

SUMMARY OF THE INVENTION

Applicants have discovered refrigerant compositions, heat transfer compositions comprising the refrigerant, refrigeration methods and systems, including methods and systems for cooling materials that have low temperature constraints, such as low- or no-freeze applications described above, which utilize one or more of the compositions of the present invention as a refrigerant.

Thus, the present invention preferably provides compositions that have no flammability, low or no substantial toxicity, low global warming potentials, and excellent heat transfer performance, especially in medium temperature refrigeration systems and methods and even more preferably in no-frost and low-frost medium temperature refrigeration systems.

Medium temperature refrigeration systems and methods are also provided by the present invention, as described in detail hereinafter.

Furthermore, Applicants have come to appreciate that in many evaporators, such as direct expansion evaporators, there is a pressure loss as the refrigerant moves through the evaporator, and in many cases the pressure drop is in an amount that results in a saturation temperature drop of from about 1° C. to 2° C.

Thus, the refrigerants of the present invention include refrigerants that have a GWP of greater than about 75 and less than about 150, are classified as A1 (non-flammable and low toxicity) by ASHRAE, and have an evaporator glide of less than about 3° C. and even more preferably less than about 2° C., and are preferably used in systems containing an evaporator where the pressure on the refrigerant decreases from the inlet to the outlet of the evaporator in an amount that reduces the saturation temperature of the refrigerant by about 1° C. to about 3° C., most preferably from about 1° C. to about 2° C. This means that the inventive refrigerants according to such embodiments are able to achieve an unexpectedly small change in refrigerant temperature through the evaporator. For example, the change in the refrigerant temperature between the inlet and the outlet of the evaporator as a result of pressure loss is preferably less than the evaporator glide (as measured at substantially constant evaporator inlet pressure), and even more preferably less than about 75% of the evaporator glide, and even more preferably less than about 50% of the evaporator glide. Thus, such preferred refrigerant composition of the present invention that have a GWP of greater than about 75 and less than about 150, and which are classified as A1 (non-flammable and low toxicity) by ASHRAE, are such that the temperature of the refrigerant may change by an amount that is less than about 1° C. as the refrigerant travels through the evaporator (i.e. the change in the refrigerant temperature between the inlet and the outlet of the evaporator as a result of pressure loss is preferably less than about 1° C.). At least in part as a result of this discovery, the methods and systems of the present invention are capable of utilizing and achieving highly efficient heat exchanger design, especially for applications like reversible heat pumps where the refrigerant flow changes direction in the heat exchanger depending on the mode of operation (cooling or heating).

The refrigerants of the present invention also include refrigerants that have a GWP of less than about 75, are classified as A1 (non-flammable and low toxicity) by ASHRAE, and have an evaporator glide of less than about 4.5° C. and are preferably used in systems containing an evaporator where the pressure on the refrigerant decreases from the inlet to the outlet of the evaporator in an amount that reduces the saturation temperature of the refrigerant by about 0.5° C. to about 2.0° C.

Thus, in preferred embodiments the refrigerants according to the present invention are used in an evaporator with a pressure drop that corresponds to a saturation temperature loss equivalent to about the refrigerant temperature increase due to glide.

DESCRIPTION OF PREFERRED COMPOSITIONS

Figure 1:
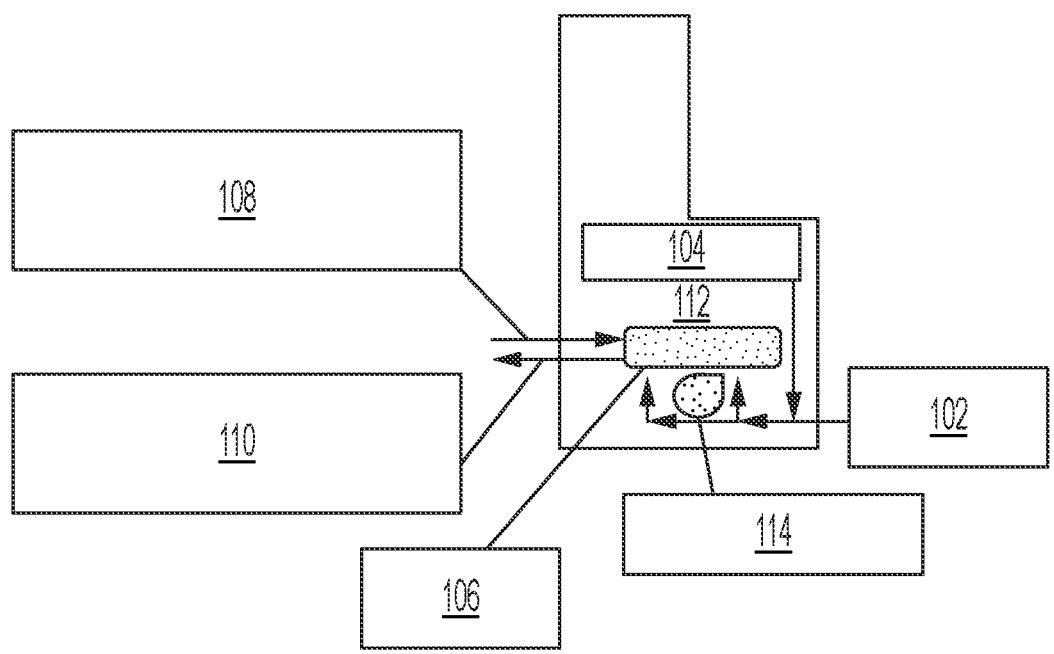
FIG. 1 represents in schematic from a typical supermarket produce cooling case.
Figure 2:
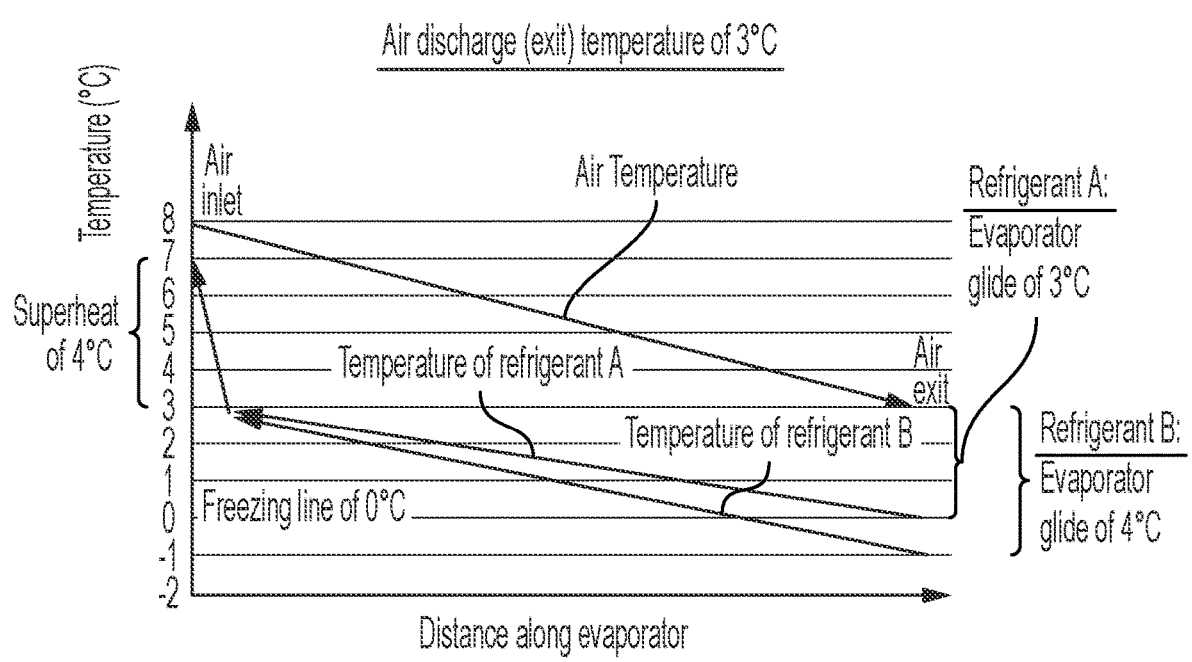
FIG. 2 illustrates the evaporator glide for Refrigerants A and B.
Figure 3:
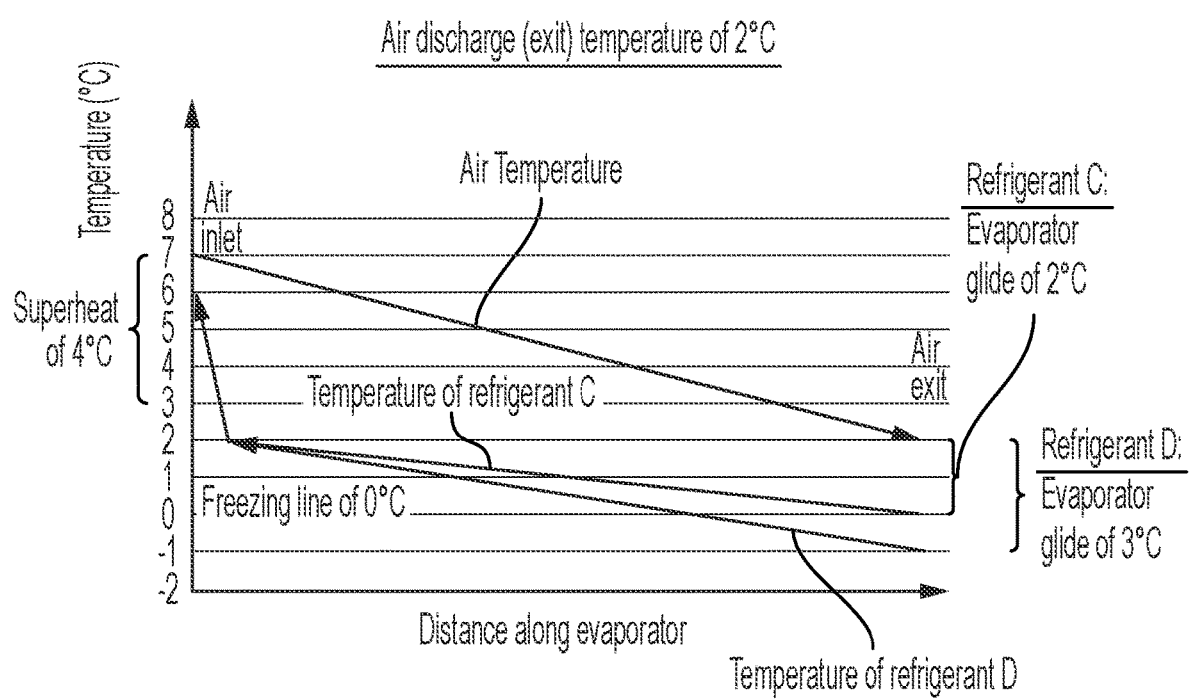
FIG. 3 illustrates the evaporator glide for Refrigerants C and D.

The present invention provides refrigerants that at once: (1) have a glide of less than 4.5, to help reduce or avoid frost formation and are able to maintain a typical degree of superheat, e.g. about 3° C. to about 5° C.; (2) are non-flammable; (3) have low or no substantial toxicity; (4) have a global warming potential (GWP) of less than about 150; and (5) have heat transfer and other physical properties (such as chemical stability) that match the needs of the particular applications, especially in medium temperature heat transfer systems and even more preferably in no-frost or low-frost medium temperature refrigeration systems.

The present invention also provides refrigerants that at once: (1) have a glide of less than about 3° C. and preferably below about 2° C. (which thus substantially avoid frost formation and are able to maintain a typical degree of superheat, e.g. about 3° C. to about 5° C.); (2) are non-flammable; (3) have low or no substantial toxicity; (4) have a GWP of greater than about 75 and less than about 150; and (5) have heat transfer and other physical properties (such as chemical stability) that match the needs of the particular applications, especially in medium temperature heat transfer systems and even more preferably in no-frost or low-frost medium temperature refrigeration systems.

The present invention also provides refrigerants that at once: (1) have a glide of less than 4.5° C.; (2) are non-flammable; (3) have low or no substantial toxicity; (4) have a GWP of less than about 75, and (5) have heat transfer and other physical properties (such as chemical stability) that match the needs of the particular applications, especially in medium temperature heat transfer systems and even more preferably in no-frost or low-frost medium temperature refrigeration systems.

Definitions

The phrase "coefficient of performance" (hereinafter "COP") is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration or cooling capacity to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988 which is incorporated herein by reference in its entirety).

The phrase "Global Warming Potential" (hereinafter "GWP") was developed to allow comparisons of the global warming impact of different gases. It compares the amount of heat trapped by a certain mass of a gas to the amount of heat trapped by a similar mass of carbon dioxide over a specific time period of time. Carbon dioxide was chosen by the Intergovernmental Panel on Climate Change (IPCC) as the reference gas and its GWP is taken as 1. The larger GWP, the more that a given gas warms the Earth compared to CO2 over that time period.

The term "non-flammable" refers to compounds or compositions which are determined to be nonflammable as determined in accordance with ASTM Standard E-681-2009 Standard Test Method for Concentration Limits of Flammability of Chemicals (Vapors and Gases) at conditions described in ASHRAE Standard 34-2016 Designation and Safety Classification of Refrigerants and described in Appendix B1 to ASHRAE Standard 34-2016 (as each standard exists as of the filing date of this application), which are incorporated herein by reference in its entirety ("Non-Flammability Test"). Flammability is defined as the ability of a composition to ignite and/or propagate a flame. Under this test, flammability is determined by measuring flame angles. A non-flammable substance would be classified as class "1" by ASHRAE Standard 34-2016 Designation and Safety Classification of Refrigerants (as each standard exists as of the filing date of this application).

As used herein, the term "evaporator glide" means the difference between the saturation temperature of the refrigerant at the entrance to the evaporator and the dew point of the refrigerant at the exit of the evaporator, assuming the pressure at the evaporator exit is the same as the pressure at the inlet. As used herein, the phrase "saturation temperature" means the temperature at which the liquid refrigerant boils into vapor at a given pressure.

The phrase "no or low toxicity" as used herein means the composition is classified as class "A" by ASHRAE Standard 34-2016 Designation and Safety Classification of Refrigerants and described in Appendix B1 to ASHRAE Standard 34-2016 (as each standard exists as of the filing date of this application). A substance which is non-flammable and low-toxicity would be classified as "A1" by ASHRAE Standard 34-2016 Designation and Safety Classification of Refrigerants and described in Appendix B1 to ASHRAE Standard 34-2016 (as each standard exists as of the filing date of this application).

The term "degree of superheat" or simply "superheat" means the temperature rise of the refrigerant at the exit of the evaporator above the saturated vapor temperature (or dew temperature) of the refrigerant.

As used herein, the term E-1,3,3,3-tetrafluoropropene means the trans isomer of HFO-1234ze and is abbreviated as HFO-1234ze (E).

As used herein, the term E-1,1,1,4,4,4-hexafluorobut-2-ene means the trans isomer of HFO-1336mzz and is abbreviated as HFO-1336mzz (E).

As used herein, the term 1,1,1,2,3,3,3-heptafluoropropane is abbreviated as HFC-227ea.

As used herein, the term "about" in relation to the amount expressed in weight percent means that the amount of the component can vary by an amount of +/−2% by weight.

Refrigerant Compositions

HFO-1234ze(E) and HFO-1336mzz (E):

The present invention provides a refrigerant which may comprise, consist essentially of, or consist of HFO-1234ze (E) and HFO-1336mzz (E).

The refrigerant may comprise: (a) from 65% by weight to about 90% by weight of HFO-1234ze(E); and (b) from about 10% by weight to about 35% by weight of HFO-1336mzz (E). It will be appreciated that the refrigerant may consist essentially of, or consist of HFO-1234ze(E) and HFO-1336mzz (E) in the above amounts. Refrigerants as described in this paragraph are sometimes referred to for convenience as Refrigerant 1.

The refrigerant may comprise: (a) from about 76% by weight to about 90% by weight of HFO-1234ze(E); and (b) from about 10% by weight to about 24% by weight of HFO-1336mzz (E). It will be appreciated that the refrigerant may consist essentially of, or consist of HFO-1234ze(E) and HFO-1336mzz (E) in the above amounts. Refrigerants as described in this paragraph are sometimes referred to for convenience as Refrigerant 1A.

The refrigerant may consist essentially of: (a) from about 65% by weight to about 78% by weight of HFO-1234ze(E); and (b) from about 22% by weight to about 35% by weight of HFO-1336mzz (E). It will be appreciated that the refrigerant may consist of HFO-1234ze(E) and HFO-1336mzz (E) in the above amounts. Refrigerants as described in this paragraph are sometimes referred to for convenience as Refrigerant 1B.

The refrigerant may consist essentially of: (a) from about 70% by weight to about 78% by weight of HFO-1234ze(E); and (b) from about 22% by weight to about 30% by weight of HFO-1336mzz (E). It will be appreciated that the refrigerant may consist of HFO-1234ze(E) and HFO-1336mzz (E) in the above amounts. Refrigerants as described in this paragraph are sometimes referred to for convenience as Refrigerant 1C.

The refrigerant may consist essentially of: (a) from 69.5% by weight to 80% by weight of HFO-1234ze(E); and (b) from 20% by weight to 30.5% by weight of HFO-1336mzz (E). It will be appreciated that the refrigerant may consist of HFO-1234ze(E) and HFO-1336mzz (E) in the above amounts. Refrigerants as described in this paragraph are sometimes referred to for convenience as Refrigerant 1D.

The refrigerant may consist essentially of: (a) 65%+0.5%/−2.0% by weight HFO-1234ze(E); and (b) 35%+2.0%/−0.5% by weight of HFO-1336mzz (E). It will be appreciated that the refrigerant may consist of HFO-1234ze (E) and HFO-1336mzz (E) in the above amounts. Refrigerants as described in this paragraph are sometimes referred to for convenience as Refrigerant 1E.

The refrigerant may consist essentially of: (a) 70%+0.5%/−2.0% by weight HFO-1234ze(E); and (b) 30%+2.0%/−0.5% by weight of HFO-1336mzz (E). It will be appreciated that the refrigerant may consist of HFO-1234ze (E) and HFO-1336mzz (E) in the above amounts. Refrigerants as described in this paragraph are sometimes referred to for convenience as Refrigerant 1F.

The refrigerant may consist essentially of: (a) from 69.5% by weight to 80% by weight of HFO-1234ze(E); and (b) from 20% by weight to 30.5% by weight of HFO-1336mzz (E). It will be appreciated that the refrigerant may consist of HFO-1234ze(E) and HFO-1336mzz (E) in the above amounts. Refrigerants as described in this paragraph are sometimes referred to for convenience as Refrigerant 1D.

The refrigerant may consist essentially of: (a) 65%+0.5%/−2.0% by weight HFO-1234ze(E); and (b) 35%+2.0%/−0.5% by weight of HFO-1336mzz (E). It will be appreciated that the refrigerant may consist of HFO-1234ze (E) and HFO-1336mzz (E) in the above amounts. Refrigerants as described in this paragraph are sometimes referred to for convenience as Refrigerant 1E.

The refrigerant may consist essentially of: (a) 70%+0.5%/−2.0% by weight HFO-1234ze(E); and (b) 30%+2.0%/−0.5% by weight of HFO-1336mzz (E). It will be appreciated that the refrigerant may consist of HFO-1234ze (E) and HFO-1336mzz (E) in the above amounts. Refrigerants as described in this paragraph are sometimes referred to for convenience as Refrigerant 1F.

The refrigerant may consist essentially of: (a) 75%+0.5%/−2.0% by weight HFO-1234ze(E); and (b) 25%+2.0%/−0.5% by weight of HFO-1336mzz (E). It will be appreciated that the refrigerant may consist of HFO-1234ze (E) and HFO-1336mzz (E) in the above amounts. Refrigerants as described in this paragraph are sometimes referred to for convenience as Refrigerant 1G.

The refrigerant may consist essentially of: (a) 78%+0.5%/−2.0% by weight HFO-1234ze(E); and (b) 20%+2.0%/−0.5% by weight of HFO-1336mzz (E). It will be appreciated that the refrigerant may consist of HFO-1234ze (E) and HFO-1336mzz (E) in the above amounts. Refrigerants as described in this paragraph are sometimes referred to for convenience as Refrigerant 1H.

The refrigerant may comprise: (a) from about 76% by weight to about 80% by weight of HFO-1234ze(E); and (b) from about 20% by weight to about 24% by weight of HFO-1336mzz (E). It will be appreciated that the refrigerant may consist essentially of, or consist of HFO-1234ze(E) and HFO-1336mzz (E) in the above amounts. Refrigerants as described in this paragraph are sometimes referred to for convenience as Refrigerant 2.

The refrigerant may comprise: (a) from about 78% by weight to about 80% by weight of HFO-1234ze(E); and (b) from about 20% by weight to about 22% by weight of HFO-1336mzz (E). It will be appreciated that the refrigerant may consist essentially of, or consist of HFO-1234ze(E) and HFO-1336mzz (E) in the above amounts. Refrigerants as described in this paragraph are sometimes referred to for convenience as Refrigerant 3.

The refrigerant may comprise: (a) about 76% by weight of HFO-1234ze(E); and (b) about 19% by weight of HFO-1336mzz (E). It will be appreciated that the refrigerant may consist essentially of, or consist of HFO-1234ze(E) and HFO-1336mzz (E) in the above amounts. Refrigerants as described in this paragraph are sometimes referred to for convenience as Refrigerant 4.

HFO-1234ze(E). HFO-1336mzz (E) and HFC-227ea:

The present invention provides a refrigerant which may comprise, consist essentially of, or consist of HFO-1234ze (E), HFO-1336mzz (E), and HFC-227ea.

The refrigerant may comprise: (a) from about 74.6% by weight to about 78f/% by weight of HFO-1234ze(E); (b) from about 17% by weight to about 21% by weight of HFO-1336mzz (E); and (c) from greater than 0% to about 4.4% by weight of HFC-227ea. Preferably, the refrigerant comprises (a) 74.6% by weight to about 78.6% by weight of HFO-1234ze(E); (b) from about 17% by weight to about 19% by weight of HFO-1336mzz (E); and (c) about 4.4% by weight of HFC-227ea. For example, the refrigerant may comprise HFC-227ea in an amount of about 4.4% by weight. It will be appreciated that the refrigerant may consist essentially of, or consist of HFO-1234ze(E), HFO-1336mzz (E) and HFC-227ea in the above amounts. Refrigerants as described in this paragraph are sometimes referred to for convenience as Refrigerant 5.

The refrigerant may comprise (a) about 78.6% by weight of HFO-1234ze(E); (b) about 17% by weight of HFO-1336mzz (E); and (c) about 4.4% by weight of HFC-227ea. It will be appreciated that the refrigerant may consist essentially of, or consist of HFO-1234ze(E), HFO-1336mzz (E) and HFC-227ea in the above amounts. Refrigerants as described in this paragraph are sometimes referred to for convenience as Refrigerant 6A.

The refrigerant may comprise: (a) about 76.6% by weight of HFO-1234ze(E); (b) about 19% by weight of HFO-1336mzz (E); and (c) about 4.4% by weight of HFC-227ea. It will be appreciated that the refrigerant may consist essentially of, or consist of HFO-1234ze(E), HFO-1336mzz (E) and HFC-227ea in the above amounts. Refrigerants as described in this paragraph are sometimes referred to for convenience as Refrigerant 6B.

The refrigerant may comprise: (a) about 74.6% by weight of HFO-1234ze(E); (b) about 21% by weight of HFO-1336mzz (E); and (c) about 4.4% by weight of HFC-227ea. It will be appreciated that the refrigerant may consist essentially of, or consist of HFO-1234ze(E), HFO-1336mzz (E) and HFC-227ea in the above amounts. Refrigerants as described in this paragraph are sometimes referred to for convenience as Refrigerant 6C.

The refrigerant may comprise: (a) 78.6%+0.5%/−2.0% by weight of HFO-1234ze(E); (b) 17%+2.0%/−0.5% by weight of HFO-1336mzz (E); and (c) 4.4%+2.0%/−0.5% by weight of HFC-227ea. It will be appreciated that the refrigerant may consist essentially of, or consist of HFO-1234ze(E), HFO-1336mzz (E) and HFC-227ea in the above amounts. Refrigerants as described in this paragraph are sometimes referred to for convenience as Refrigerant 6D.

The refrigerant may comprise: (a) 76.6%+0.5%/−2.0% by weight of HFO-1234ze(E); (b) 19%+2.0%/−0.5% by weight of HFO-1336mzz (E); and (c) 4.4%+2.0%/−0.5% by weight of HFC-227ea. It will be appreciated that the refrigerant may consist essentially of, or consist of HFO-1234ze(E), HFO-1336mzz (E) and HFC-227ea in the above amounts. Refrigerants as described in this paragraph are sometimes referred to for convenience as Refrigerant 6E.

The refrigerant may comprise: (a) 74.6%+0.5%/−2.0% by weight of HFO-1234ze(E); (b) 21%+2.0%/−0.5% by weight of HFO-1336mzz (E); and (c) 4.4%+2.0%/−0.5% by weight of HFC-227ea. It will be appreciated that the refrigerant may consist essentially of, or consist of HFO-1234ze(E), HFO-1336mzz (E) and HFC-227ea in the above amounts. Refrigerants as described in this paragraph are sometimes referred to for convenience as Refrigerant 6F.

The refrigerant may comprise: (a) 78.6% by weight of HFO-1234ze(E); (b) 17% by weight of HFO-1336mzz (E); and (c) 4.4% by weight of HFC-227ea. It will be appreciated that the refrigerant may consist essentially of, or consist of HFO-1234ze(E), HFO-1336mzz (E) and HFC-227ea in the above amounts. Refrigerants as described in this paragraph are sometimes referred to for convenience as Refrigerant 6G.

The refrigerant may comprise: (a) 76.6% by weight of HFO-1234ze(E); (b) 19% by weight of HFO-1336mzz (E); and (c) 4.4% by weight of HFC-227ea. It will be appreciated that the refrigerant may consist essentially of, or consist of HFO-1234ze(E), HFO-1336mzz (E) and HFC-227ea in the above amounts. Refrigerants as described in this paragraph are sometimes referred to for convenience as Refrigerant 6H.

The refrigerant may comprise: (a) 74.6% by weight of HFO-1234ze(E); (b) 21% by weight of HFO-1336mzz (E); and (c) 4.4% by weight of HFC-227ea. It will be appreciated that the refrigerant may consist essentially of, or consist of HFO-1234ze(E), HFO-1336mzz (E) and HFC-227ea in the above amounts. Refrigerants as described in this paragraph are sometimes referred to for convenience as Refrigerant 6I.

The refrigerant may comprise: (a) from about 78.6% by weight to about 80.6% by weight of HFO-1234ze(E); (b) from about 15% by weight to about 17% by weight of HFO-1336mzz (E); and (c) about 4.4% by weight of HFC-227ea. It will be appreciated that the refrigerant may consist essentially of, or consist of HFO-1234ze(E), HFO-1336mzz (E) and HFC-227ea in the above amounts. Refrigerants as described in this paragraph are sometime referred to for convenience as Refrigerant 7.

The refrigerant, including each of Refrigerants 1-7, has a GWP of less than about 150. As used here, the term "Refrigerants 1-7" means separately and independently each of the Refrigerants 1, 1A, 1B, 1C, 1D, 1E, 1F, 1G, 1H, 2, 3, 4, 5, 6A, 6B, 6C, 6D, 6E, 6F, 6G, 6H, 6I and 7.

Certain preferred refrigerants of the present invention, including each of Refrigerants 1E-1H, has a GWP of less than about 75.

The refrigerant, including each of Refrigerants 1-7, advantageously may be non-flammable. In other words, the refrigerant may be a class 1 refrigerant.

The refrigerant, including each of Refrigerants 1-7, has no or low toxicity. In other words, the refrigerant is a class A refrigerant.

The refrigerant, including each of Refrigerants 1-7, preferably has a glide of less than 4.5, more preferably less than about 3° C., and even more preferably of less than about 2° C.

It will be appreciated that the refrigerant, including each of Refrigerants 1-7, in preferred embodiments has a combination of one or more of, and most preferably all of, the above properties.

Heat Transfer Compositions

The refrigerants of the invention may be provided in a heat transfer composition. Thus, the heat transfer compositions of the present invention comprise a refrigerant of the present invention, including any of the preferred refrigerant compositions disclosed herein and in particular each of Refrigerants 1-7. Preferably, the invention relates to a heat transfer composition which comprises the refrigerant, including each of Refrigerants 1-7, in an amount of at least about 80% by weight of the heat transfer composition, or at least about 90% by weight of the heat transfer composition, or at least about 97% by weight of the heat transfer composition, or at least about 99% by weight of the heat transfer composition. The heat transfer composition may consist essentially of or consist of the refrigerant.

Lubricants:

Preferably, the heat transfer composition may additionally comprise a lubricant. The lubricant lubricates the refrigeration compressor using the refrigerant. Preferably the lubricant is present in the heat transfer composition in amounts of from about 1% to about 50% by weight of heat transfer composition, more preferably in amounts of from about 10% to about 50% by weight of the heat transfer composition, and most preferably about 30% to about 50% by weight of the heat transfer composition. Useful lubricants include, alkyl benzenes, esters, polyol esters ("POEs"), poly alkylene glycols ("PAGs"), polyvinyl ethers ("PVEs"), poly(alpha-olefin)("PAOs"), and combinations thereof. Commercially available alkyl benzene lubricants include Zerol 150 (registered trademark). PAGs are available as GM Goodwrench Refrigeration Oil and MOPAR-56. Other useful esters include phosphate esters, dibasic acid esters, and fluoroesters.

Commercially available POEs include neopentyl glycol dipelargonate which is available as Emery 2917 (registered trademark) and Hatcol 2370 (registered trademark) and pentaerythritol derivatives including those sold under the trade designations Emkarate RL32-3MAF and Emkarate RL68H by CPI Fluid Engineering. Emkarate RL32-3MAF and Emkarate RL68H have the properties identified in the following table:

| Property | RL32-3MAF | RL68H |
|---|---|---|
| Viscosity @ 40° C. (ASTM D445), cSt | about 31 | about 67 |
| Viscosity @ 100° C. (ASTM D445), cSt | about 5.6 | about 9.4 |
| Pour Point (ASTM D97), ° C. | about −40 | about −40 |

Commercially available PVE's include the polyvinylethers FVC-32D (registered trademark) and FVC-68D (registered trademark) by Idemitsu.

Preferred lubricants include POEs and PVEs, more preferably POEs. Of course, different mixtures of different types of lubricants may be used.

The heat transfer composition of the present invention may consist essentially of or consist of a refrigerant, including each of Refrigerants 1-7, and lubricant, including in particular each of the preferred lubricants as described above.

A preferred heat transfer composition of the invention comprises any one of the Refrigerants 1-7 and POE lubricant.

A preferred heat transfer composition of the invention comprises Refrigerant 6D and POE lubricant.

A preferred heat transfer composition of the invention comprises Refrigerant 6D and POE lubricant having a viscosity @ 40° C. (ASTM D445) of from about 31 to about 67.

A preferred heat transfer composition of the invention comprises Refrigerant 6D and POE lubricant having a viscosity @ 100° C. (ASTM D445) of from about 5 to about 10.

A preferred heat transfer composition of the invention comprises Refrigerant 6E and POE lubricant.

A preferred heat transfer composition of the invention comprises Refrigerant 6E and POE lubricant having a viscosity @ 40° C. (ASTM D445) of from about 31 to about 67.

A preferred heat transfer composition of the invention comprises Refrigerant 6E and POE lubricant having a viscosity @ 100° C. (ASTM D445) of from about 5 to about 10.

A preferred heat transfer composition of the invention comprises Refrigerant 6F and POE lubricant.

A preferred heat transfer composition of the invention comprises Refrigerant 6F and POE lubricant having a viscosity @ 40° C. (ASTM D445) of from about 31 to about 67.

A preferred heat transfer composition of the invention comprises Refrigerant 6F and POE lubricant having a viscosity @ 100° C. (ASTM D445) of from about 5 to about 10.

A preferred heat transfer composition of the invention comprises Refrigerant 6G and POE lubricant.

A preferred heat transfer composition of the invention comprises Refrigerant 6G and POE lubricant having a viscosity @ 40° C. (ASTM D445) of from about 31 to about 67.

A preferred heat transfer composition of the invention comprises Refrigerant 6G and POE lubricant having a viscosity @ 100° C. (ASTM D445) of from about 5 to about 10.

A preferred heat transfer composition of the invention comprises Refrigerant 6H and POE lubricant.

A preferred heat transfer composition of the invention comprises Refrigerant 6H and POE lubricant having a viscosity @ 40° C. (ASTM D445) of from about 31 to about 67.

A preferred heat transfer composition of the invention comprises Refrigerant 6H and POE lubricant having a viscosity @ 100° C. (ASTM D445) of from about 5 to about 10.

A preferred heat transfer composition of the invention comprises Refrigerant 6I and POE lubricant.

A preferred heat transfer composition of the invention comprises Refrigerant 6I and POE lubricant having a viscosity @ 40° C. (ASTM D445) of from about 31 to about 67.

A preferred heat transfer composition of the invention comprises Refrigerant 6I and POE lubricant having a viscosity @ 100° C. (ASTM D445) of from about 5 to about 10.

A preferred heat transfer composition of the invention comprises any one of the Refrigerants 1-7 and PVE lubricant.

A preferred heat transfer composition of the invention comprises Refrigerant 6D and PVE lubricant.

A preferred heat transfer composition of the invention comprises Refrigerant 6E and PVE lubricant.

A preferred heat transfer composition of the invention comprises Refrigerant 6F and PVE lubricant.

A preferred heat transfer composition of the invention comprises Refrigerant 6G and PVE lubricant.

A preferred heat transfer composition of the invention comprises Refrigerant 6H and PVE lubricant.

A preferred heat transfer composition of the invention comprises Refrigerant 6I and PVE lubricant.

Uses:

The methods and systems of the present invention may comprise any heat transfer system and/or any heat transfer method which utilize a refrigerant, including each of Refrigerants 1-7, or a heat transfer composition comprising a refrigerant of the present invention, including each of Refrigerants 1-7, to either absorb heat, or reject heat or both absorb and reject heat. Thus, the present invention provides a method of heating or cooling a fluid or body using a refrigerant, including each of Refrigerants 1-7, or using a heat transfer composition comprising a refrigerant of the present invention, including each of Refrigerants 1-7. The invention also provides a heat transfer system comprising a refrigerant, including each of Refrigerants 1-7, or a heat transfer composition comprising a refrigerant of the present invention, including each of Refrigerants 1-7. It will be appreciated that the heat transfer systems described herein may be a vapor compression systems having an evaporator, a condenser and a compressor in fluid communication.

Applicants have found that substantial advantage can be achieved in connection with heat transfer systems and heat transfer methods in which a refrigerant, including each of Refrigerants 1-7, or heat transfer composition of the present invention that includes a refrigerant of the present invention, Refrigerants 1-7, is used to absorb heat from a fluid surrounding an article, or otherwise in thermal communication to with the article itself, such as might occur to cool produce and/or other refrigerated food, or as might occur in connection with the cooling of certain electronic devices. In such cases, the fluid may be air or a secondary coolant (for example: water, glycol, water/glycol mixtures, brine, etc.), such as would occur in the case of the refrigerant being used in an evaporator in systems and methods which require that the temperature of the article or fluid being cooled is not exposed to temperatures below a certain limit.

Thus, in general, the present methods and systems utilize apparatus and/or processes which permit the refrigerant or heat transfer composition of the present invention to absorb heat and also apparatus and/or processes which then remove the absorbed heat from the refrigerant.

The present invention provides a refrigeration, air conditioning, or heat pump system comprising a refrigerant, including each of Refrigerants 1-7, or heat transfer composition comprising a refrigerant of the present invention, including each of Refrigerants 1-7.

The present invention provides a refrigeration, air conditioning, or heat pump system comprising a refrigerant according to any one of Refrigerants 6D, 6E, 6F, 6G, 6H and 6I, or heat transfer composition comprising a refrigerant of the present invention, including each of Refrigerants 6D, 6E, 6F, 6G, 6H and 6I.

It will be appreciated that the evaporator which is used to absorb heat from the article or fluid being cooled may include conduits and the like, such as for example cooling coils, through which the refrigerant flows, including each of Refrigerants 1-7, while such conduit is being exposed to the article or fluid (directly or indirectly) to be cooled. In this way, heat flows from the fluid (e.g. air) being cooled and/or the article located in the vicinity (such as fresh produce, such as fruits, vegetables, and flowers) through the metal or other heat conductive material of the conduit and into the refrigerant of the present invention, including each of Refrigerants 1-7.

Applicants have discovered that the refrigerant compositions of the present invention, including each of Refrigerants 1-7, preferably have an evaporator glide that is less than about 3° C., and even more preferably less than about 2° C. for systems in which the cooled discharge air is controlled at a temperature of from about 2° C. to about 5° C., when the cooled discharge air is at a temperature of from about 2° C. to about 4° C., and more preferably in certain embodiments (such as cooling fresh cut fruit, vegetables, and flowers for example), the cooled discharge air is at a temperature of from about 2° C. to about 3° C.

Figure 4:
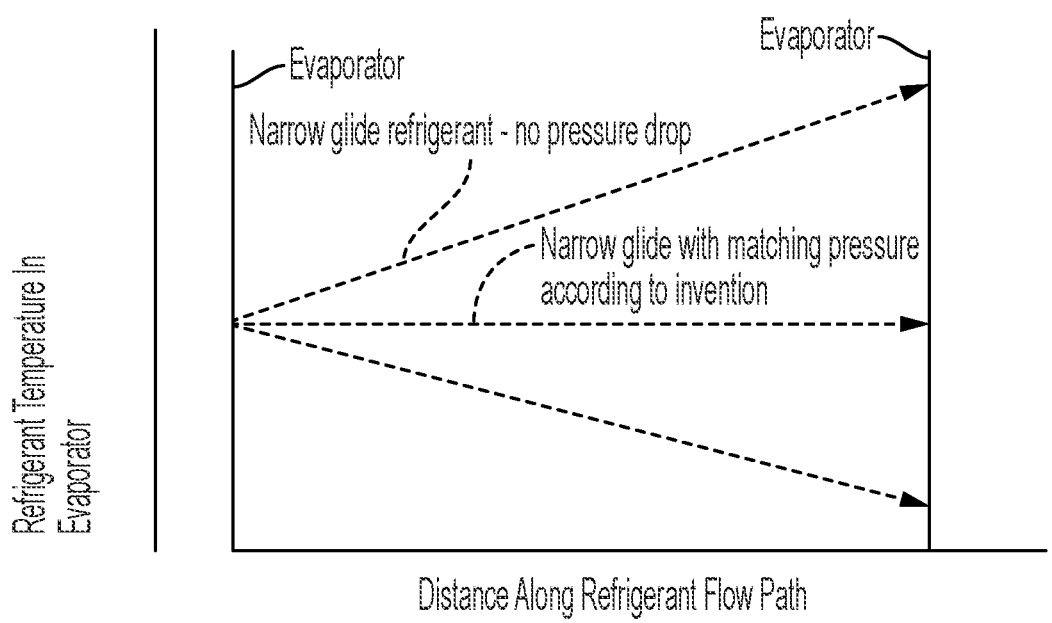
FIG. 4 illustrates the pressure drop benefit of the present invention.

Applicant's discovery of this effect which is achievable according to the methods and systems of the present invention utilizing the preferred refrigerant compositions of the present invention, including each of Refrigerants 1-7, and heat exchanger design of the present invention is illustrated schematically in FIG. 4.

It will be appreciated that the refrigerant according to the present invention, including each of Refrigerants 1-7, may be used in a system having an evaporator with a pressure drop that corresponds to a saturation temperature loss equivalent to about the refrigerant temperature increase due to glide.

Specific systems and methods of the invention are described below.

Refrigeration Systems

The present invention provides a refrigeration system comprising a refrigerant or heat transfer composition of the invention. The present invention also provides a method for cooling a fluid or body using a refrigeration system wherein the method comprises the steps of (a) evaporating a refrigerant composition of the invention, including each of Refrigerants 1-7, in the vicinity of the fluid or body to be cooled, and (b) condensing the refrigerant.

The refrigerant and heat transfer compositions of the invention can be used in any refrigeration system. However, Applicants have found that the present refrigerant, including each of Refrigerants 1-7, and the present heat transfer compositions comprising a refrigerant of the present invention, including each of Refrigerants 1-7, provide a particular advantage in medium temperature refrigeration system, and in particular, medium temperature refrigeration systems used in "no frost" applications, e.g. applications where the refrigerant temperature along the evaporator must remain above the freezing point of water (i.e. above 0° C.). This ensures that frost does not accumulate on the evaporator surface and, consequently, a defrost cycle is not required, or a less frequent defrost cycle is required.

The refrigerant and heat transfer compositions of the invention can be used in any refrigeration system. However, Applicants have found that the present refrigerant, including each of Refrigerants 6D, 6E, 6F, 6G, 6H and 6I, or heat transfer composition comprising a refrigerant of the present invention, including each of Refrigerants 6D, 6E, 6F, 6G, 6H and 6I, provide a particular advantage in medium temperature refrigeration system, and in particular, medium temperature refrigeration systems used in "no frost" applications, e.g. applications where the refrigerant temperature along the evaporator must remain above the freezing point of water (i.e. above 0° C.). This ensures that frost does not accumulate on the evaporator surface and, consequently, a defrost cycle is not required, or a less frequent defrost cycle is required.

Thus, the present invention relates to a medium temperature refrigeration system comprising a refrigerant, including any one of Refrigerants 6D, 6E, 6F, 6G, 6H and 6I, or heat transfer composition comprising a refrigerant of the present invention, including each of Refrigerants 6D, 6E, 6F, 6G, 6H and 6I. The present invention also provides a method of cooling a fluid or body in a medium temperature refrigeration system, the method comprising the steps of (a) evaporating a refrigerant composition of the invention, including each of Refrigerants 6D, 6E, 6F, 6G, 6H and 6I, or heat transfer composition comprising a refrigerant of the present invention, including each of Refrigerants 6D, 6E, 6F, 6G, 6H and 6I, in the vicinity of the fluid or body to be cooled, and (b) condensing the refrigerant. Preferably the evaporator temperature is from about −15° C. to about 5° C., more preferably from about −10° C. to about 5° C.

A medium temperature refrigeration system as used herein refers to a refrigeration system that utilizes one or more compressors and operates under or within the following conditions: (a) a condenser temperature of from about 15° C. to about 60° C., preferably from about 25° C. to about 45° C.; (b) evaporator temperature of from about −15° C. to about 5° C., preferably from about −10° C. to about 5° C.; optionally (c) a degree of superheat at evaporator outlet of from about 0° C. to about 10° C., preferably with a degree of superheat at evaporator outlet of from about 1° C. to about 6° C.; and optionally (d) a degree of superheat in the suction line of from about 5° C. to about 40C, preferably with a degree of superheat in the suction line of from about 15° C. to about 30° C. The superheat along the suction line may also be generated by a heat exchanger.

Examples of medium temperature refrigeration systems include small refrigeration systems (including vending machines, ice machines, and appliances), commercial refrigeration systems (such as supermarket refrigeration systems and walk-in coolers), residential refrigeration systems, industrial refrigeration systems, and ice rinks.

In the case of the storage of perishable produce such as vegetables and fruits in a medium temperature refrigeration system, for example, the fluid to be cooled is air having a desired cooled temperature of from about 2° C. to about 5° C., and preferably from about 2° C. to about 4° C., and more preferably (such as cooling fresh cut fruit, vegetables, and flowers for example), from about 2° C. to about 3° C. Furthermore, in many applications, it is preferred that the refrigerant temperature along the evaporator does not reach below about 0° C. (freezing point of water) to avoid the formation of frost. Preferably, at the same time, the superheat at the exit of the evaporator should be maintained at a typical value of from about 3° C. to about 5° C., and preferably about 4° C.

Therefore, the invention preferably provides a medium temperature refrigeration system comprising a refrigerant, including each of Refrigerants 1-7, or heat transfer composition comprising a refrigerant of the present invention, including each of Refrigerants 1-7 wherein the system has an evaporator temperature of from about 0° C. to about 5° C.

Therefore, the invention preferably provides a medium temperature refrigeration system comprising a refrigerant, including each of Refrigerants 6D, 6E, 6F, 6G, 6H and 6I, or heat transfer composition comprising a refrigerant of the present invention, including each of Refrigerants 6D, 6E, 6F, 6G, 6H and 6I, wherein the system has an evaporator temperature of from about 0° C. to about 5° C.

The present invention also provides a method of cooling a fluid or body in a medium temperature refrigeration system/wherein the method comprising the steps of (a) evaporating a refrigerant composition of the invention, including each of Refrigerants 1-7, in the vicinity of the fluid or body to be cooled, and (b) condensing said refrigerant, wherein said system has an evaporator temperature of from about 0° C. to about 5° C.

The refrigerant and heat transfer compositions of the invention can also be used in other refrigeration applications.

For example, the present invention relates to a low temperature refrigeration system comprising a refrigerant, including each of Refrigerants 1-7, or heat transfer composition comprising a refrigerant of the present invention, including each of Refrigerants 1-7. The present invention also provides a method of cooling a fluid or body in a low temperature refrigeration system, said method comprising the steps of (a) evaporating a refrigerant composition of the invention, including each of Refrigerants 1-7, in the vicinity of the fluid or body to be cooled, and (b) condensing said refrigerant. Preferably the evaporator temperature is from about −40° C. to less than about −15° C., more preferably from about −40° C. to about −25° C.

For example, the present invention relates to a low temperature refrigeration system comprising a refrigerant, including each of Refrigerants 6D, 6E, 6F, 6G, 6H and 6I, or heat transfer composition comprising a refrigerant of the present invention, including each of Refrigerants 6D, 6E, 6F, 6G, 6H and 6I. The present invention also provides a method of cooling a fluid or body in a low temperature refrigeration system, said method comprising the steps of (a) evaporating a refrigerant composition of the invention, including each of Refrigerants 6D, 6E, 6F, 6G, 6H and 6I, or heat transfer composition comprising a refrigerant of the present invention, including each of Refrigerants 6D, 6E, 6F, 6G, 6H and 6I, in the vicinity of the fluid or body to be cooled, and (b) condensing said refrigerant. Preferably the evaporator temperature is from about −40° C. to less than about −15° C., more preferably from about −40° C. to about −25° C.

A low temperature refrigeration system as used herein to refers to a refrigeration system that utilizes one or more compressors and operates under or within the following conditions: (a) condenser temperature from about 15° C. to about 50° C., preferably of from about 25° C. to about 45° C.; (b) evaporator temperature from about −40° C. to about or less than about −15° C., preferably from about −40° C. to about −25° C.; optionally (c) a degree of superheat at evaporator outlet of from about 0° C. to about 10° C., preferably of from about 1° C. to about 6° C.; and optionally (d) a degree of superheat in the suction line of from about 15° C. to about 40° C., preferably of from about 20° C. to about 30° C.

Examples of low temperature refrigeration systems include supermarket refrigeration systems, commercial freezer systems (including supermarket freezers), residential freezer systems, and industrial freezer systems.

The low temperature refrigeration system may be used to cool frozen goods.

The present invention relates to a cascade refrigeration system comprising a refrigerant or heat transfer composition of the invention.

Generally, a cascade system has two or more stages. When a cascade system has two stages, these are generally referred to as the upper stage and the lower stage. The refrigerant of the invention, including each of Refrigerants 1-7, or heat transfer compositions comprising a refrigerant of the present invention, including each of Refrigerants 1-7 may be used in either the upper or lower stage of a cascade refrigeration system. However, it is preferred that the refrigerant of the invention, including each of Refrigerants 1-7, or a heat transfer composition comprising a refrigerant of the present invention, including each of Refrigerants 1-7 is used in the upper stage of a cascade system. In view of the teachings contained herein, a person skilled in the art will be able to determine suitable refrigerants for use in the lower stage of the cascade system, and include for example CO2, R1234yf, and R455A. R455A is a blend of 75.5% R1234yf, 21.5% R32, and 3% CO2. In cascade systems, the present refrigerants may replace R404A.

Generally, a cascade system has two or more stages. When a cascade system has two stages, these are generally referred to as the upper stage and the lower stage. The refrigerant of the invention, including each of Refrigerants 6D, 6E, 6F, 6G, 6H and 6I, or heat transfer composition comprising a refrigerant of the present invention, including each of Refrigerants 6D, 6E, 6F, 6G, 6H and 6I, may be used in either the upper or lower stage of a cascade refrigeration system. However, it is preferred that the refrigerant of the invention, including each of Refrigerants 6D, 6E, 6F, 6G, 6H and 6I, or heat transfer composition comprising a refrigerant of the present invention, including each of Refrigerants 6D, 6E, 6F, 6G, 6H and 6I, is used in the upper stage of a cascade system. In view of the teachings contained herein, a person skilled in the art will be able to determine suitable refrigerants for use in the lower stage of the cascade system, and include for example CO2, R1234yf, and R455A. R455A is a blend of 75.5% R1234yf, 21.5% R32, and 3% CO2. In cascade systems, the present refrigerants may replace R404A.

Transport refrigeration creates the link in the cold chain allowing frozen or chilled produce to reach the end user in the correct temperature environment. The present invention relates to a transport refrigeration system comprising a refrigerant of the invention, including each of Refrigerants 1-7, or a heat transfer composition comprising a refrigerant of the present invention, including each of Refrigerants 1-7.

Transport refrigeration creates the link in the cold chain allowing frozen or chilled produce to reach the end user in the correct temperature environment. The present invention relates to a transport refrigeration system comprising a refrigerant of the invention, including each of Refrigerants 6D, 6E, 6F, 6G, 6H and 6I, or heat transfer composition comprising a refrigerant of the present invention, including each of Refrigerants 6D, 6E, 6F, 6G, 6H and 6I.

Examples of transport refrigeration include refrigerated road vehicles (such as trucks and vans), train railcars, and containers capable of being transported by road vehicles, trains, and ships/boats.

Secondary Loop Systems

The refrigerant of the present invention, including each of Refrigerants 1-7, or heat transfer composition comprising a refrigerant of the present invention, including each of Refrigerants 1-7 may be used as secondary fluid in a secondary loop system. A secondary loop system contains a primary vapor compression system loop that uses a primary refrigerant and has an evaporator that cools the secondary loop fluid. The secondary fluid then provides the necessary cooling for an application. The secondary fluid must be non-flammable and have low-toxicity since the refrigerant in such a loop is potentially exposed to humans in the vicinity of the cooled space. In other words, the refrigerant of the present invention, including each of Refrigerants 1-7, may be used as a "secondary fluid". A primary fluid for use in the primary loop (vapor compression cycle, external/outdoors part of the loop) may include the following refrigerants but not limited to R404A, R507, R410A, R455A, R32, R466A, R44B, R290, R717, R452B, R448A, R1234ze(E), R1234yf, and R449A.

The refrigerant of the present invention, including each Refrigerants 6D, 6E, 6F, 6G, 6H and 6I, or heat transfer composition comprising a refrigerant of the present invention, including each of Refrigerants 6D, 6E, 6F, 6G, 6H and 6I, may be used as secondary fluid in a secondary loop system. A secondary loop system contains a primary vapor compression system loop that uses a primary refrigerant and has an evaporator that cools the secondary loop fluid. The secondary fluid then provides the necessary cooling for an application. The secondary fluid must be non-flammable and have low-toxicity since the refrigerant in such a loop is potentially exposed to humans in the vicinity of the cooled space. In other words, the refrigerant of the present invention, including each of Refrigerants 6D, 6E, 6F, 6G, 6H and 6I, may be used as a "secondary fluid". A primary fluid for use in the primary loop (vapor compression cycle, external/outdoors part of the loop) may include the following refrigerants but not limited to R404A, R507, R410A, R455A, R32, R466A, R44B, R290, R717, R452B, R448A, R1234ze(E), R1234yf, and R449A.

Heat Dump Systems

The present invention relates to a heat pump system comprising a refrigerant of the invention, including each of Refrigerants 1-7, or a heat transfer composition comprising a refrigerant of the present invention, including each of Refrigerants 1-7.

The present invention also provides a method of heating a fluid or body using a heat pump, the method comprising the steps of (a) condensing a refrigerant composition of the invention, including each of Refrigerants 1-7, in the vicinity of the fluid or body to be heated, and (b) evaporating the refrigerant.

The present invention relates to a heat pump system comprising a refrigerant of the invention, including each of Refrigerants 6D, 6E, 6F, 6G, 6H and 6I, or a heat transfer composition comprising a refrigerant of the present invention, including each of Refrigerants 6D, 6E, 6F, 6G, 6H and 6I.

The present invention also provides a method of heating a fluid or body using a heat pump, the method comprising the steps of (a) condensing a refrigerant composition of the invention, including each of Refrigerants 6D, 6E, 6F, 6G, 6H and 6I, in the vicinity of the fluid or body to be heated, and (b) evaporating the refrigerant.

Examples of heat pumps include heat pump tumble driers, reversible heat pumps, high temperature heat pumps, and air-to-air heat pumps.

Air Conditioning Systems

The present invention relates to an air conditioning system comprising a refrigerant or of the invention, including each of Refrigerants 1-7, or heat transfer composition comprising a refrigerant of the present invention, including each of Refrigerants 1-7. The present invention also provides a method of air conditioning using an air conditioning system, said method comprising the steps of (a) evaporating a refrigerant composition of the invention, including each of Refrigerants 1-7, in the vicinity of a fluid of body to be cooled, and (b) condensing said refrigerant. Air may be conditioned either directly or indirectly by the refrigerants of the invention, including each of Refrigerants 1-7.

The present invention relates to an air conditioning system comprising a refrigerant or of the invention, including each of Refrigerants 6D, 6E, 6F, 6G, 6H and 6I, or a heat transfer composition comprising a refrigerant of the present invention, including each of Refrigerants 6D, 6E, 6F, 6G, 6H and 6I. The present invention also provides a method of air conditioning using an air conditioning system, said method comprising the steps of (a) evaporating a refrigerant composition of the invention, including each of Refrigerants 6D, 6E, 6F, 6G, 6H and 6I, in the vicinity of a fluid of body to be cooled, and (b) condensing said refrigerant. Air may be conditioned either directly or indirectly by the refrigerants of the invention, including each of Refrigerants 6D, 6E, 6F, 6G, 6H and 6I.

Examples of air conditioning systems include chillers, residential, industrial, commercial, and mobile air-conditioning including air conditioning of road vehicles such as automobiles, trucks and buses, as well as air conditioning of boats, and trains.

Preferred refrigeration systems of the present invention include chillers comprising a refrigerant of the present invention, including particularly each of Refrigerants 1-7, and even more particularly Refrigerants 4 and 6A-6I.

Preferred refrigeration systems of the present invention include residential air-conditioning systems comprising a refrigerant of the present invention, including particularly each of Refrigerants 1-7, and even more particularly Refrigerants 4 and 6A-6I.

Preferred refrigeration systems of the present invention include industrial air-conditioning systems comprising a refrigerant of the present invention, including particularly each of Refrigerants 1-7, and even more particularly Refrigerants 4 and 6A-6I.

Preferred refrigeration systems of the present invention include commercial air-conditioning systems comprising a refrigerant of the present invention, including particularly each of Refrigerants 1-7, and even more particularly Refrigerants 4 and 6A-6I.

Preferred refrigeration systems of the present invention include mobile air-conditioning systems comprising a refrigerant of the present invention, including particularly each of Refrigerants 1-7, and even more particularly Refrigerants 4 and 6A-6I.

It will be appreciated that any of the above refrigeration, air conditioning or heat pump systems using the refrigerant of the invention, including each of Refrigerants 1-7, or heat transfer compositions comprising a refrigerant of the present invention, including each of Refrigerants 1-7, may comprise a suction line/liquid line heat exchanger (SL-LL HX).

It will be appreciated that any of the above refrigeration, air conditioning or heat pump systems using the refrigerant of the invention, including each of Refrigerants 6D, 6E, 6F, 6G, 6H and 6I, or heat transfer compositions comprising a refrigerant of the present invention, including each of Refrigerants 6D, 6E, 6F, 6G, 6H and 6I, may comprise a suction line/liquid line heat exchanger (SL-LL HX).

Organic Rankine Cycle Systems

The refrigerant composition of the invention, including each of Refrigerants 1-7, or a heat transfer composition comprising a refrigerant of the present invention, including each of Refrigerants 1-7, may be used in an organic Rankine cycle (ORC). In the context of ORC, the refrigerant used in these systems may also be categorized as the "working fluid".

The refrigerant composition of the invention, including each of Refrigerants 6D, 6E, 6F, 6G, 6H and 6I, or a heat transfer composition comprising a refrigerant of the present invention, including each of Refrigerants 6D, 6E, 6F, 6G, 6H and 6I, may be used in an organic Rankine cycle (ORC). In the context of ORC, the refrigerant used in these systems may also be categorized as the "working fluid".

Rankine cycle systems are known to be a simple and reliable means to convert heat energy into mechanical shaft power.

In industrial settings, it may be possible to use flammable working fluids such as toluene and pentane, particularly when the industrial setting has large quantities of flammables already on site in processes or storage. However, for instances where the risk associated with use of a flammable and/or toxic working fluid is not acceptable, such as power generation in populous areas or near buildings, it is necessary to use non-flammable and/or non-toxic refrigerants as the working fluid. There is also a drive in the industry for these materials to be environmentally acceptable in terms of GWP.

The process for recovering waste heat in an Organic Rankine cycle system involves pumping liquid-phase working-fluid through a heat exchanger (boiler) where an external (waste) heat source, such as a process stream, heats the working fluid causing it to evaporate into a saturated or superheated vapor. This vapor is expanded through a turbine wherein the waste heat energy is converted into mechanical energy. Subsequently, the vapor phase working fluid is condensed to a liquid and pumped back to the boiler in order to repeat the heat extraction cycle.

Therefore, the invention relates to the use of a refrigerant of the invention, including each of Refrigerants 1-7, or a heat transfer compositions comprising a refrigerant of the present invention, including each of Refrigerants 1-7, in an Organic Rankine Cycle.

Therefore, the invention provides a process for converting thermal energy to mechanical energy in a Rankine cycle, the method comprising the steps of i) vaporizing a working fluid with a heat source and expanding the resulting vapor, or vaporizing a working fluid with a heat source and expanding the resulting vapor, then ii) cooling the working fluid with a heat sink to condense the vapor, wherein the working fluid is a refrigerant or of the invention, including each of Refrigerants 1-7, or heat transfer compositions comprising a refrigerant of the present invention, including each of Refrigerants 1-7.

The mechanical work may be transmitted to an electrical device such as a generator to produce electrical power.

The heat source may be provided by a thermal energy source selected from industrial waste heat, solar energy, geothermal hot water, low pressure steam, distributed power generation equipment utilizing fuel cells, an internal combustion engine, or prime movers. Preferably, the low pressure steam is a low pressure geothermal steam or is provided by a fossil fuel powered electrical generating power plant.

It will be appreciated that the heat source temperatures can vary widely, for example from about 90° C. to >800° C., and can be dependent upon a myriad of factors including geography, time of year, etc. for certain combustion gases and some fuel cells. Systems based on sources such as waste water or low pressure steam from, e.g., a plastics manufacturing plants and/or from chemical or other industrial plant, petroleum refinery, and the like, as well as geothermal sources, may have source temperatures that are at or below about 100° C., and in some cases as low as about 90° C. or even as low as about 80° C. Gaseous sources of heat such as exhaust gas from combustion process or from any heat source where subsequent treatments to remove particulates and/or corrosive species result in low temperatures may also have source temperatures that are at or below about 130° C., at or below about 120° C., at or below about 100° C., at or below about 100° C., and in some cases as low as about 90° C. or even as low as about 80° C.

Electronic Cooling

The refrigerant compositions of the invention, including any one of Refrigerants 1 to 7, may be used in connection with systems and methods of electronic cooling, such as cooling of chips, electronic boards, batteries (including batteries used in cars, trucks, buses and other electronic transport vehicles), computers, and the like.

The refrigerant compositions of the invention, including any one of Refrigerants 6D, 6E, 6F, 6G, 6H and 6I, may be used in connection with systems and methods of electronic cooling, such as cooling of chips, electronic boards, batteries (including batteries used in cars, trucks, buses and other electronic transport vehicles), computers, and the like.

Heat Transfer Compositions

Heat transfer compositions comprise any one of Refrigerants 1 to 7 and lubricant in a low temperature refrigeration system as follows:

| REFRIGERANT | LUBRICANT | REFRIGERATION SYSTEM |
| --- | --- | --- |
| Refrigerant 1 | POE or PVE | low temperature refrigeration |
| Refrigerant 1A | POE or PVE | low temperature refrigeration |
| Refrigerant 1B | POE or PVE | low temperature refrigeration |
| Refrigerant 1C | POE or PVE | low temperature refrigeration |
| Refrigerant 1D | POE or PVE | low temperature refrigeration |
| Refrigerant 1E | POE or PVE | low temperature refrigeration |
| Refrigerant 1F | POE or PVE | low temperature refrigeration |
| Refrigerant 1G | POE or PVE | low temperature refrigeration |
| Refrigerant 1H | POE or PVE | low temperature refrigeration |
| Refrigerant 2 | POE or PVE | low temperature refrigeration |
| Refrigerant 3 | POE or PVE | low temperature refrigeration |
| Refrigerant 4 | POE or PVE | low temperature refrigeration |
| Refrigerant 5 | POE or PVE | low temperature refrigeration |
| Refrigerant 6A | POE or PVE | low temperature refrigeration |
| Refrigerant 6B | POE or PVE | low temperature refrigeration |
| Refrigerant 6C | POE or PVE | low temperature refrigeration |
| Refrigerant 6D | POE or PVE | low temperature refrigeration |
| Refrigerant 6E | POE or PVE | low temperature refrigeration |
| Refrigerant 6F | POE or PVE | low temperature refrigeration |
| Refrigerant 7 | POE or PVE | low temperature refrigeration |

Heat transfer compositions comprise any one of Refrigerants 1 to 7 and lubricant in a medium temperature refrigeration system as follows

| REFRIGERANT | LUBRICANT | REFRIGERATION SYSTEM |
| --- | --- | --- |
| Refrigerant 1 | POE or PVE | medium temperature refrigeration |
| Refrigerant 1A | POE or PVE | medium temperature refrigeration |
| Refrigerant 1B | POE or PVE | medium temperature refrigeration |

| REFRIGERANT | LUBRICANT | REFRIGERATION SYSTEM |
|---|---|---|
| Refrigerant 1C | POE or PVE | medium temperature refrigeration |
| Refrigerant 1D | POE or PVE | medium temperature refrigeration |
| Refrigerant 1E | POE or PVE | medium temperature refrigeration |
| Refrigerant 1F | POE or PVE | medium temperature refrigeration |
| Refrigerant 1G | POE or PVE | medium temperature refrigeration |
| Refrigerant 1H | POE or PVE | medium temperature refrigeration |
| Refrigerant 2 | POE or PVE | medium temperature refrigeration |
| Refrigerant 3 | POE or PVE | medium temperature refrigeration |
| Refrigerant 4 | POE or PVE | medium temperature refrigeration |
| Refrigerant 5 | POE or PVE | medium temperature refrigeration |
| Refrigerant 6A | POE or PVE | medium temperature refrigeration |
| Refrigerant 6B | POE or PVE | medium temperature refrigeration |
| Refrigerant 6C | POE or PVE | medium temperature refrigeration |
| Refrigerant 6D | POE or PVE | medium temperature refrigeration |
| Refrigerant 6E | POE or PVE | medium temperature refrigeration |
| Refrigerant 6F | POE or PVE | medium temperature refrigeration |
| Refrigerant 7 | POE or PVE | medium temperature refrigeration |

Heat transfer compositions comprise any one of Refrigerants 1 to 7 and lubricant in a retail food refrigeration system as follows:

| REFRIGERANT | LUBRICANT | REFRIGERATION SYSTEM |
|---|---|---|
| Refrigerant 1 | POE or PVE | Retail food refrigeration |
| Refrigerant 1A | POE or PVE | Retail food refrigeration |
| Refrigerant 1B | POE or PVE | Retail food refrigeration |
| Refrigerant 1C | POE or PVE | Retail food refrigeration |
| Refrigerant 1D | POE or PVE | Retail food refrigeration |
| Refrigerant 1E | POE or PVE | Retail food refrigeration |
| Refrigerant 1F | POE or PVE | Retail food refrigeration |
| Refrigerant 1G | POE or PVE | Retail food refrigeration |
| Refrigerant 1H | POE or PVE | Retail food refrigeration |
| Refrigerant 2 | POE or PVE | Retail food refrigeration |
| Refrigerant 3 | POE or PVE | Retail food refrigeration |
| Refrigerant 4 | POE or PVE | Retail food refrigeration |
| Refrigerant 5 | POE or PVE | Retail food refrigeration |
| Refrigerant 6A | POE or PVE | Retail food refrigeration |
| Refrigerant 6B | POE or PVE | Retail food refrigeration |
| Refrigerant 6C | POE or PVE | Retail food refrigeration |
| Refrigerant 6D | POE or PVE | Retail food refrigeration |
| Refrigerant 6E | POE or PVE | Retail food refrigeration |
| Refrigerant 6F | POE or PVE | Retail food refrigeration |
| Refrigerant 7 | POE or PVE | Retail food refrigeration |

Heat transfer compositions comprise any one of Refrigerants 1 to 7 and lubricant in a transport container refrigeration system as follows:

| REFRIGERANT | LUBRICANT | REFRIGERATION SYSTEM |
|---|---|---|
| Refrigerant 1 | POE or PVE | Transport container refrigeration |
| Refrigerant 1A | POE or PVE | Transport container refrigeration |
| Refrigerant 1B | POE or PVE | Transport container refrigeration |
| Refrigerant 1C | POE or PVE | Transport container refrigeration |
| Refrigerant 1D | POE or PVE | Transport container refrigeration |
| Refrigerant 1E | POE or PVE | Transport container refrigeration |
| Refrigerant 1F | POE or PVE | Transport container refrigeration |
| Refrigerant 1G | POE or PVE | Transport container refrigeration |
| Refrigerant 1H | POE or PVE | Transport container refrigeration |
| Refrigerant 2 | POE or PVE | Transport container refrigeration |
| Refrigerant 3 | POE or PVE | Transport container refrigeration |
| Refrigerant 4 | POE or PVE | Transport container refrigeration |
| Refrigerant 5 | POE or PVE | Transport container refrigeration |
| Refrigerant 6A | POE or PVE | Transport container refrigeration |
| Refrigerant 6B | POE or PVE | Transport container refrigeration |
| Refrigerant 6C | POE or PVE | Transport container refrigeration |
| Refrigerant 6D | POE or PVE | Transport container refrigeration |
| Refrigerant 6E | POE or PVE | Transport container refrigeration |
| Refrigerant 6F | POE or PVE | Transport container refrigeration |
| Refrigerant 7 | POE or PVE | Transport container refrigeration |

EXAMPLES

In the examples which follow, the refrigerant compositions of interest are identified as compositions A1-A8 in Table 1 below. The refrigerant compositions identified in Table 1 below as Refrigerants A1, A2, A3, A4, A4', A4", A5, A6, A7 and A8 are refrigerants within the scope of the present invention as described herein. Each of the refrigerants was subjected to thermodynamic analysis to determine its ability to match the operating characteristics of R-134a in various refrigeration systems. The analysis was performed using experimental data collected for properties of various binary and ternary pairs of components used in the refrigerant. The composition of each pair was varied over a series of relative percentages in the experimental evaluation and the mixture parameters for each pair were regressed to the experimentally obtained data. Known vapor/liquid equilibrium behavior data available in the National Institute of Science and Technology (NIST) Reference Fluid Thermodynamic and Transport Properties Database software (Refprop 9.1 NIST Standard Database 23 from April 2016) were used for the Examples. The parameters selected for conducting the analysis were: same compressor displacement for all refrigerants, same operating conditions for all refrigerants, same compressor isentropic and volumetric efficiency for all refrigerants. In each Example, simulations were conducted using the measured vapor liquid equilibrium data. The simulation results are reported for each Example.

TABLE 1

Refrigerants evaluated for Performance Examples

| Refrigerant | R1234ze(E) (wt %) | R1336mzz(E) (wt %) | R227ea (wt %) | Evaporator Glide (deg C.) | GWP |
|---|---|---|---|---|---|
| A1 | 85.6% | 10% | 4.4% | 1.5 | 143 |
| A2 | 82.6% | 13% | 4.4% | 2.0 | 144 |
| A3 | 80.6% | 15% | 4.4% | 2.2 | 144 |
| A4 | 78.6% | 17% | 4.4% | 2.5 | 145 |
| A4' | 76.6% | 19% | 4.4% | 2.7 | 145 |
| A4" | 74.6% | 21% | 4.4% | 3.0 | 145 |
| A5 | 78% | 22% | 0% | 3.0 | 4 |
| A6 | 75% | 25% | 0% | 3.3 | 5 |
| A7 | 70% | 30% | 0% | 3.8 | 5 |
| A8 | 65% | 35% | 0% | 4.2 | 6 |

Example 1: Performance in Medium Temperature Refrigeration System with and without Suction Line (SL)/Liquid Line (LL) Heat Exchanger (HX)

Refrigerants A1 to A8 were performance tested in a medium temperature refrigeration system with and without a suction line/liquid line heat exchanger (SL/LL HX). The analysis was carried out to assess the efficiency (COP) of Refrigerants A1 to A8 in this system at different levels of effectiveness of the SL-LL HX under the conditions below.
  Operating Conditions were:
  Condensing temperature=45° C.
  Condensing Temperature-Ambient Temperature=10° C.
  Condenser sub-cooling=0.0° C. (system with receiver)
  Evaporating temperature=−80° C.,
  Evaporator Superheat=5.5° C.
  Compressor Isentropic Efficiency=65%
  Volumetric Efficiency=100%
  Temperature Rise in Suction Line=10° C.
  Suction Line/Liquid Line Heat Exchanger Effectiveness: 0%, 35%, 55%, 75%

TABLE 2

Performance in Medium-Temperature Refrigeration System with SL/LL HX

| Refrigerant | Efficiency @0% SL-LL HX effectiveness | Efficiency @35% SL-LL HX effectiveness | Efficiency @55% SL-LL HX effectiveness | Efficiency @75% SL-LL HX effectiveness |
|---|---|---|---|---|
| R134a | 100% | 100% | 100% | 100% |
| A1 | 100% | 101% | 102% | 103% |
| A2 | 100% | 101% | 102% | 103% |
| A3 | 100% | 101% | 102% | 103% |
| A4 | 100% | 101% | 102% | 103% |
| A4' | ~100% | ~101% | ~102% | ~103% |
| A4" | ~100% | ~101% | ~102% | ~103% |
| A5 | 100% | 101% | 102% | 103% |
| A6-A8 | ~100% | ~101% | ~102% | ~103% |

Table 2 shows the performance of refrigerants in a medium temperature refrigeration system. It will be understood that the results under the column with "0%" efficiency for the SL-LL HX represent a system without a SL-LL HX, and that Refrigerants A1 to A8 show improved performance in terms of efficiency (COP) than R134a when a SL/LL Heat Exchanger is employed, with compositions A4, A4' and A4" showing exceptional performance when all relevant performance factors are considered.

Example 2: Performance in Low Temperature Refrigeration System with and without Suction Line/Liquid Line Heat Exchanger Refrigerants A1 to A8 were performance tested in a low temperature refrigeration system with and without a suction line/liquid line heat exchanger (SL/LL HX). The analysis was carried out to assess the efficiency (COP) of Refrigerants A1 to A8 in this system at different levels of effectiveness of the SL-LL HX under the conditions below.

Operating Conditions were:
Condensing temperature=45° C.
Condensing Temperature-Ambient Temperature=10° C.
Condenser sub-cooling=0.0° C. (system with receiver)
Evaporating temperature=−35° C., Corresponding box temperature=−25° C.
Evaporator Superheat=5.5° C.
Compressor Isentropic Efficiency=65%
Volumetric Efficiency=100%
Temperature Rise in Suction Line=10° C.
Suction Line/Liquid Line Heat Exchanger Effectiveness: 0%, 35%, 55%, 75%

TABLE 3

Performance in Low-Temperature Refrigeration System with SL/LL HX

| Refrigerant | Efficiency @0% SL-LL HX effectiveness | Efficiency @35% SL-LL HX effectiveness | Efficiency @55% SL-LL HX effectiveness | Efficiency @75% SL-LL HX effectiveness |
|---|---|---|---|---|
| R134a | 100% | 100% | 100% | 100% |
| A1 | 97% | 100% | 101% | 103% |
| A2 | 97% | 100% | 101% | 103% |
| A3 | 97% | 100% | 101% | 103% |
| A4 | 97% | 100% | 101% | 103% |
| A4' | ~97% | ~100% | ~101% | ~103% |
| A4" | ~97% | ~100% | ~101% | ~103% |
| A5 | 97% | 100% | 102% | 103% |
| A6-A8 | ~97% | ~100% | ~102% | ~103% |

Table 3 shows the performance of refrigerants in a low temperature refrigeration system.

It will be understood that the results under the column with "0%" efficiency for the SL-LL HX represent a system without a SL-LL HX, and that Refrigerants A1 to A8 show improved performance in terms of efficiency (COP) than R134a when a SL/LL Heat Exchanger is employed, with composition A4, A4' and A4" showing exceptional performance when all relevant performance factors are considered.

Example 3: Performance in Medium Temperature Refrigeration System with Two-Stage Vapor Injected Compression Refrigerants A1 to A8 were performance tested in a medium temperature refrigeration system with two stage injection compression. The analysis was carried out to assess the efficiency (COP) of Refrigerants A1 to A8 in this system under the conditions below.

Operating Conditions were:
Condensing temperature=45° C.
Condensing Temperature-Ambient Temperature=10° C.
Condenser sub-cooling=5.0° C.
Evaporating temperature=−8° C., Corresponding box temperature=1.7° C.
Evaporator Superheat=5.5° C.
Compressor Isentropic Efficiency=70%
Volumetric Efficiency=100%
Temperature Rise in Suction Line=10° C.
Vapor Injection Heat Exchanger (HX) Effectiveness: 15%, 35%, 55%, 75%

TABLE 4

Performance in Medium-Temperature Refrigeration System with Two-Stage Compression with Vapor Injection

| Refrigerant | Efficiency @15% vapour injection HX effectiveness | Efficiency @35% vapour injection HX effectiveness | Efficiency @55% vapour injection HX effectiveness | Efficiency @75% vapour injection HX effectiveness |
|---|---|---|---|---|
| R134a | 100% | 100% | 100% | 100% |
| A1 | 100% | 100% | 101% | 101% |
| A2 | 101% | 101% | 101% | 101% |
| A3 | 101% | 101% | 101% | 101% |
| A4 | 101% | 101% | 101% | 101% |
| A4' | ~101% | ~101% | ~101% | ~101% |
| A4" | ~101% | ~101% | ~101% | ~101% |
| A5 | 101% | 101% | 101% | 101% |
| A6-A8 | ~101% | ~101% | ~101% | ~101% |

Table 4 shows the performance of refrigerants in a medium temperature refrigeration system. Compositions A2 to A8 show improved performance in terms of efficiency (COP) than R134a in a two stage compression with vapor injection, with composition A4, A4' and A4" showing exceptional performance when all relevant performance factors are considered.

Example 4: Performance in $CO_2$ Cascade Refrigeration System

Cascade systems are generally used in applications where there is a large temperature difference (e.g. about 50-80° C., such as about 60-70° C.) between the ambient temperature and the box temperature (e.g. the difference in temperature between the air-side of the condenser in the high stage, and the air-side of the evaporator in the low stage). For example, a cascade system may be used for freezing products in a supermarket. In the following Example, exemplary compositions of the invention were tested as the refrigerant in the high-stage of a cascade refrigeration system. The refrigerant used in the low-stage of the system was carbon dioxide.

Operating Conditions were:
Condensing temperature=45° C.
High-stage Condensing Temperature-Ambient Temperature=10° C.
High-stage condenser sub-cooling=0.0° C. (system with receiver)
Evaporating temperature=−30° C., Corresponding box temperature=−18° C.
Low-stage Evaporator Superheat=3.3° C.
High-stage and Low-stage Compressor Isentropic Efficiency=65%
Volumetric Efficiency=100%
Temperature Rise in Suction Line Low Stage=15° C.
Temperature Rise in Suction Line High Stage=10° C.
Intermediate Heat Exchanger $CO_2$ Condensing Temperature=0° C., 5° C. and 10° C.
Intermediate Heat Exchanger Superheat=3.3° C.
Difference in Temperature in Intermediate Heat Exchanger=8° C.

TABLE 5

Performance in CO2 Cascade Refrigeration System

| Refrigerant | Efficiency @ Tcond = 0° C. | Efficiency @ Tcond = 5° C. | Efficiency @ Tcond = 10° C. |
|---|---|---|---|
| R134a | 100% | 100% | 100% |
| A1 | 100% | 100% | 100% |
| A2 | 100% | 100% | 100% |
| A3 | 100% | 100% | 100% |
| A4 | 100% | 100% | 100% |
| A4' | ~100% | ~100% | ~100% |
| A4" | ~100% | ~100% | ~100% |
| A5 | 100% | 100% | 100% |
| A6-A8 | ~100% | ~100% | ~100% |

Table 5 shows the performance of refrigerants in the high stage of a cascade refrigeration system. Refrigerants A1 to A8 match the efficiency of R134a for different condensing temperatures of low stage cycle, with composition A4, A4' and A4" showing exceptional performance when all relevant performance factors are considered.

Example 5: Performance in Vending Machines with Suction Line/Liquid Line Heat Exchanger Refrigerants A1 to A8 were performance tested in a vending machine refrigeration system with and without a suction line/liquid line heat exchanger (SL/LL HX). The analysis was carried out to assess the efficiency (COP) of Refrigerants A1 to A8 in this system at different levels of effectiveness of the SL-LL HX under the conditions below.

Operating Conditions:
Condensing temperature=45° C.
Condensing Temperature-Ambient Temperature=10° C.
Condenser sub-cooling=5.5° C.
Evaporating temperature=−8° C.,
Evaporator Superheat=3.5° C.
Compressor Isentropic Efficiency=60%
Volumetric Efficiency=100%
Temperature Rise in Suction Line=5° C.
Suction Line/Liquid Line Heat Exchanger Effectiveness: 0%, 35%, 55%, 75%

TABLE 6

Performance in Vending Machine with SL/LL HX

| Refrigerant | Efficiency @0% SL-LL HX effectiveness | Efficiency @35% SL-LL HX effectiveness | Efficiency @55% SL-LL HX effectiveness | Efficiency @75% SL-LL HX effectiveness |
|---|---|---|---|---|
| R134a | 100% | 100% | 100% | 100% |
| A1 | 100% | 101% | 102% | 103% |
| A2 | 100% | 101% | 102% | 103% |
| A3 | 100% | 101% | 102% | 103% |
| A4 | 100% | 101% | 102% | 103% |
| A4' | ~100% | ~101% | ~102% | ~103% |
| A4" | ~100% | ~101% | ~102% | ~103% |
| A5 | 100% | 101% | 102% | 103% |
| A6-A8 | ~100% | ~101% | ~102% | ~103% |

Table 6 shows performance of refrigerants in a vending machine system with and without SU/LL HX. It will be understood that the results under the column with "0%" efficiency for the SL-LL HX represent a system without a SL-LL HX, and that Refrigerants A1 to A8 show improved performance in terms of efficiency (COP) than R134a when a SU/LL Heat Exchanger is employed, with composition A4, A4' and A4" showing exceptional performance when all relevant performance factors are considered.

Example 6: Performance in Air-Source Heat Pump Water Heaters

Refrigerants A1 to A8 were performance tested in an air source heat pump water heater system. The analysis was carried out to assess the efficiency (COP) of Refrigerants A1 to A8 in this system under the conditions below.

Operating Conditions were:
Condensing temperature=55° C.
Water Inlet Temperature=45° C., Water Outlet Temperature=50° C.
Condenser sub-cooling=5.0° C.
Evaporating temperature=−5° C., Corresponding ambient temperature=10° C.
Evaporator Superheat=3.5° C.
Compressor Isentropic Efficiency=65%
Volumetric Efficiency=100%
Temperature Rise in Suction Line=5° C.
Suction Line/Liquid Line Heat Exchanger Effectiveness: 0%, 35%, 55%, 75%

TABLE 7

Performance in Heat Pump Water Heaters

| Refrigerant | Efficiency | Comp. Discharge Temp (° C.) |
|---|---|---|
| R134a | 100% | 92.5 |
| A1 | 100% | 82.1 |
| A2 | 100% | 82.3 |
| A3 | 100% | 82.4 |
| A4 | 100% | 82.6 |
| A4' | ~100% | ~82.6 |
| A4" | ~100% | ~82.6 |
| A5 | 100% | 82.9 |
| A6-A8 | ~100% | ~82.9 |

Table 7 shows performance of refrigerants in a heat pump water heater. Refrigerants A1 to A8 show efficiency similar to R134a, with composition A4, A4' and A4" showing exceptional performance when all relevant performance factors are considered. Refrigerants A1 to A8 show lower discharge temperature than R134a, indicating better reliability for the compressor.

Example 7: Performance in Air-Source Heat Pump Water Heaters with Suction Line/Liquid Line Heat Exchanger Refrigerants A1 to A8 were performance tested in an air source heat pump water heater system with and without a suction line/liquid line heat exchanger (SL/LL HX). The analysis was carried out to assess the efficiency (COP) of Refrigerants A1 to A8 in this system at different levels of effectiveness of the SL-LL HX under the conditions below.
Operating Conditions were:
Condensing temperature=55° C.
Water Inlet Temperature=45° C., Water Outlet Temperature=50° C.
Condenser sub-cooling=5.0° C.
Evaporating temperature=−5° C., Corresponding ambient temperature=10° C.
Evaporator Superheat=3.5° C.
Compressor Isentropic Efficiency=65%
Volumetric Efficiency=100%
Temperature Rise in Suction Line=5° C.
Suction Line/Liquid Line Heat Exchanger Effectiveness: 0%, 35%, 55%, 75%

TABLE 8

Performance in Heat Pump Water Heaters with SL/LL HX

| Refrigerant | SL-LL HX Eff. 35% | | SL-LL HX Eff. 55% | | SL-LL HX Eff. 75% | |
| --- | --- | --- | --- | --- | --- | --- |
| | Efficiency | Comp. Discharge Temp (° C.) | Efficiency | Comp. Discharge Temp (° C.) | Efficiency | Comp. Discharge Temp (° C.) |
| R134a | 100% | 107.4 | 100% | 118.4 | 100% | 129.3 |
| A1 | 101% | 95.3 | 102% | 105.9 | 102% | 116.5 |
| A2 | 101% | 95.2 | 102% | 105.8 | 102% | 116.3 |
| A3 | 101% | 95.1 | 102% | 105.6 | 102% | 116.1 |
| A4 | 101% | 94.9 | 102% | 105.4 | 102% | 115.8 |
| A4' | ~101% | ~94.9 | ~102% | ~105.4 | ~102% | ~115.8 |
| A4" | ~101% | ~94.9 | ~102% | ~105.4 | ~102% | ~115.8 |
| A5 | 101% | 94.6 | 102% | 104.9 | 103% | 115.1 |
| A6-A8 | ~101% | ~94.6 | ~102% | ~104.9 | ~103% | ~115.1 |

Table 8 shows performance of refrigerants in a heat pump water heater with SL/LL HX. Refrigerants A1 to A8 show higher efficiency than R134a when a SL/LL Heat Exchanger is employed, with composition A4, A4' and A4" showing exceptional performance when all relevant performance factors are considered. Refrigerants A1 to A8 show lower discharge temperature than R134a, indicating better reliability for the compressor.

Example 8: Performance in Mobile Air Conditioning Systems (Buses, Trains, Cars)

Refrigerants A1 to A8 were performance tested in a mobile air conditioning system under various condenser temperature conditions. The analysis was carried out to assess the efficiency (COP) of Refrigerants A1 to A8 in this system under the conditions below
Operating Conditions:
Condensing temperature=45° C. to 75° C.
Condenser sub-cooling=5.0° C.
Evaporating temperature=4° C., corresponding indoor room temperature=35° C.
Evaporator Superheat=5.0° C.
Compressor Isentropic Efficiency=65%
Volumetric Efficiency=100%
Temperature Rise in Suction Line=0° C.

TABLE 9

Performance in Mobile AC systems

| Refrigerant | Condensing 45° C. Efficiency | Condensing 55° C. Efficiency | Condensing 65° C. Efficiency | Condensing 75° C. Efficiency |
| --- | --- | --- | --- | --- |
| R134a | 100% | 100% | 100% | 100% |
| A1 | 100% | 100% | 99% | 99% |
| A2 | 100% | 100% | 99% | 99% |
| A3 | 100% | 100% | 99% | 99% |
| A4 | 100% | 100% | 99% | 99% |
| A4' | ~100% | ~100% | ~99% | ~99% |
| A4" | ~100% | ~100% | ~99% | ~99% |
| A5 | 100% | 100% | 100% | 99% |
| A6-A8 | ~100% | ~100% | ~100% | ~99% |

In Table 9, Refrigerants A1 to A8 show efficiency similar to R134a over a range of condensing temperatures which correspond to different ambient temperatures, with composition A4, A4' and A4" showing exceptional performance when all relevant performance factors are considered.

Example 9: Micro-Cascade Refrigeration System

A micro-cascade system combines a traditional medium temperature DX refrigeration system, with or without suction line liquid line heat exchanger (SLHX), which operates with the fluid inventions, a low temperature cascade refrigeration in which the upper state uses the fluid inventions and is connected to several small low temperature stages, in the form of self-contained systems, using fluids such as but not limited to $CO_2$, R1234yf, and R455A. As used herein, the term "medium temperature DX refrigeration system" refers to a medium temperature system in which the evaporator is a dry evaporator.

A useful micro-cascade system is disclosed in our pending U.S. Ser. No. 16/014,863 filed Jun. 21, 2018 and U.S. Ser. No. 16/015,145 filed Jun. 21, 2018, claiming priority to U.S. Ser. 62/522,386 filed Jun. 21, 2017, U.S. Ser. 62/522,846 filed Jun. 21, 2017, 62/522,851 filed Jun. 21, 2017, and Ser. 62/522,860 filed Jun. 21, 2017, all incorporated herein by reference in their entireties.

Operating Conditions:
Baseline R404A Combined MT and LT System
Refrigeration Capacity
Low Temperature: 33,000 W
Medium Temperature: 67,000 W
Volumetric efficiency: 95% for both MT ad LT
Compressor Isentropic efficiency
Medium Temperature=70% and Low Temperature=67%
Condensing temperature: 105° F.
Medium Temperature evaporation temperature: 20° F.
Low Temperature evaporation temperature: −20° F.
Evaporator superheat: 10° F. (both Medium and Low Temperature)
Suction line temperature rise (due to heat transfer to surroundings)
Baseline: Medium Temperature: 25° F.; Low Temperature: 50° F.
Cascade/self-contained without SLHX: Medium Temperature: 10° F.;
Low Temperature: 25° F.
Cascade/self-contained with SLHX: Medium Temperature: 10° F.; Low
Temperature: 15° F.
SLHX efficiency when used: 65%

TABLE 10

Comparison between R404A and the micro-cascade system

| Systems | High stage (medium temperature) | Low stage (Low temperature) | Relative COP % of R404A |
|---|---|---|---|
| R404A | | R404A | 100% |
| Cascade with R1234yf | A1 | R1234yf | 126% |
| | A2 | R1234yf | 126% |
| | A3 | R1234yf | 126% |
| | A4 | R1234yf | 126% |
| | A4' | R1234yf | ~126% |
| | A4" | R1234yf | ~126% |
| | A5 | R1234yf | 126% |
| | A6-A8 | R1234yf | ~126% |
| Cascade with R455A | A1 | R455A | 126% |
| | A2 | R455A | 126% |
| | A3 | R455A | 126% |
| | A4 | R455A | 126% |
| | A4' | R455A | ~126% |
| | A4" | R455A | ~126% |
| | A5 | R455A | 126% |
| | A6-A8 | R455A | ~126% |

The table above shows that the micro-cascade system has about 126% higher COP than a baseline medium temperature DX system with R404A.

Example 10: Non-Flammable Secondary Refrigerants with Pressure Above Atmospheric Pressure The inventive refrigerants, including each of Refrigerants 1-7, or heat transfer compositions comprising a refrigerant of the present invention, including each of Refrigerants 1-7, can work as secondary fluids. The refrigerants of the invention, including each of Refrigerants 1-7, have the necessary properties to ensure that the operating pressure of the refrigerant is not below atmospheric pressure at the given evaporator temperature, so that air would not enter the system and at the same time it is low enough to prevent significant leaks.

Table 11 shows the pressure of refrigerants for evaporating temperatures ranging from −5° C. to 10° C. which cover the various operating conditions for air conditioning applications.

It can be observed from the table that all refrigerants maintain pressure higher than atmospheric pressure.

The primary refrigerant used in the vapor compression loop may be selected from the group consisting of R404A, R507, R410A, R455A, R32, R466A, R44B, R290, R717, R452B, R448A, R1234ze(E), R1234yf and R449A.

The temperature of the air (or body) to be cooled may be from about 25° C. to about 0° C.

TABLE 11

Secondary Fluids

| Secondary Refrigerant | Evaporator Temperature (° C.) | Evaporator Pressure (bar) |
|---|---|---|
| A1 | −5 | 1.7 |
| | 0 | 2.0 |
| | 10 | 2.9 |
| A2 | −5 | 1.6 |
| | 0 | 2.0 |
| | 10 | 2.8 |
| A3 | −5 | 1.6 |
| | 0 | 2.0 |
| | 10 | 2.8 |
| A4, A4' and A4" | −5 | 1.6 |
| | 0 | 1.9 |
| | 10 | 2.8 |
| A5-A8 | −5 | 1.5 |
| | 0 | 1.8 |
| | 10 | 2.6 |

Example 11: Performance in Stationary Air Conditioning Systems

Refrigerants A1 to A8 were performance tested in a stationary air conditioning system under various condenser temperature conditions. The analysis was carried out to assess the efficiency (COP) of Refrigerants A1 to A8 in this system under the conditions below.

Operating Conditions:
Condensing temperature=45° C. to 65° C.
Condenser sub-cooling=5.0° C.
Evaporating temperature=10° C., corresponding indoor room temperature=35° C.
Evaporator Superheat=5.0° C.
Compressor Isentropic Efficiency=72%
Volumetric Efficiency=100%

TABLE 12

Performance in Stationary AC systems

| Refrigerant | Condensing 45° C. Efficiency | Condensing 55° C. Efficiency | Condensing 65° C. Efficiency |
|---|---|---|---|
| R134a | 100% | 100% | 100% |
| A1 | 100% | 100% | 100% |
| A2 | 100% | 100% | 100% |
| A3 | 100% | 100% | 100% |
| A4, A4' and A4" | 100% | 100% | 100% |
| A5-A8 | 100% | 100% | 100% |

Refrigerants A1 to A8 show efficiency similar to R134a over range of condensing temperatures which correspond to different ambient temperatures, with composition A4, A4' and A4" showing exceptional performance when all relevant performance factors are considered.

Example 12: Performance in Commercial Air Conditioning Systems

Refrigerants A1 to A8 were performance tested in a commercial air conditioning system under various condenser temperature conditions. The analysis was carried out to assess the efficiency (COP) of Refrigerants A1 to A8 in this system under the conditions below.

Operating Conditions:

Condensing temperature=45° C. to 65° C.

Condenser sub-cooling=5.0° C.

Evaporating temperature=10° C.,

Evaporator Superheat=5.0° C.

Compressor Isentropic Efficiency=72%

Volumetric Efficiency=100%

TABLE 13

Performance in Stationary AC systems

| Refrigerant | Condensing 45° C. Efficiency | Condensing 55° C. Efficiency | Condensing 65° C. Efficiency |
|---|---|---|---|
| R134a | 100% | 100% | 100% |
| A1 | 100% | 100% | 100% |
| A2 | 100% | 100% | 100% |
| A3 | 100% | 100% | 100% |
| A4, A4' and A4" | 100% | 100% | 100% |
| A5-A8 | 100% | 100% | 100% |

Refrigerants A1 to A8 show efficiency similar to R134a over range of condensing temperatures which correspond to different ambient temperatures, with composition A4, A4' and A4" showing exceptional performance when all relevant performance factors are considered.

Example 13: Performance in Transport (Refrigerated Trucks, Containers) Refrigeration Applications with and without Suction Line (SL)/Liquid Line (LL) Heat Exchanger (HX)

Refrigerants A1 to A8 were performance tested in a transport refrigeration system with and without a suction line/liquid line heat exchanger (SL/LL HX) at medium temperature refrigeration conditions. The analysis was carried out to assess the efficiency (COP) of Refrigerants A1 to A8 in this system at different levels of effectiveness of the SL-LL HX under the conditions below.

Operating Conditions were:

Condensing temperature=45° C.

Condensing Temperature-Ambient Temperature=10° C.

Condenser sub-cooling=0.0° C. (system with receiver)

Evaporating temperature=−8° C.,

Evaporator Superheat=5.5° C.

Compressor Isentropic Efficiency=65%

Volumetric Efficiency=100%

Temperature Rise in Suction Line=15° C.

Suction Line/Liquid Line Heat Exchanger Effectiveness: 0%, 35%, 55%, 75%

TABLE 14

Performance in Medium-Temperature Refrigeration System with SL/LL HX

| Refrigerant | Efficiency @0% SL-LL HX effectiveness | Efficiency @35% SL-LL HX effectiveness | Efficiency @55% SL-LL HX effectiveness | Efficiency @75% SL-LL HX effectiveness |
|---|---|---|---|---|
| R134a | 100% | 100% | 100% | 100% |
| A1 | 100% | 101% | 102% | 103% |
| A2 | 100% | 101% | 102% | 103% |
| A3 | 100% | 101% | 102% | 103% |
| A4, A4' and A4" | 100% | 101% | 102% | 103% |
| A5-A8 | 100% | 101% | 102% | 103% |

Table 14 shows the performance of Refrigerants A1 to A8 in a transport refrigeration system. It will be understood that the results under the column with "0%" efficiency for the SL-LL HX represent a system without a SL-LL HX, and that Refrigerants A1 to A8 show improved performance in terms of efficiency (COP) than R134a when a SL/LL Heat Exchanger is employed, with composition A4, A4' and A4" showing exceptional performance when all relevant performance factors are considered.

Example 14: Performance in Transport (Refrigerated Trucks, Containers) Refrigeration Applications with and without Suction Line/Liquid Line Heat Exchanger Refrigerants A1 to A8 were performance tested in a transport refrigeration system with and without a suction line/liquid line heat exchanger (SL/LL HX) at low temperature refrigeration conditions. The analysis was carried out to assess the efficiency (COP) of Refrigerants A1 to A8 in this system at different levels of effectiveness of the SL-LL HX under the conditions below.

Operating Conditions were:

Condensing temperature=45° C.

Condensing Temperature-Ambient Temperature=10° C.

Condenser sub-cooling=0.0° C. (system with receiver)

Evaporating temperature=−35° C., Corresponding box temperature=−25° C.

Evaporator Superheat=5.5° C.

Compressor Isentropic Efficiency=65%

Volumetric Efficiency=100%

Temperature Rise in Suction Line=15° C.

Suction Line/Liquid Line Heat Exchanger Effectiveness: 0%, 35%, 55%, 75%

TABLE 15

Performance in Low-Temperature Refrigeration System with SL/LL HX

| Refrigerant | Efficiency @0% SL-LL HX effectiveness | Efficiency @35% SL-LL HX effectiveness | Efficiency @55% SL-LL HX effectiveness | Efficiency @75% SL-LL HX effectiveness |
|---|---|---|---|---|
| R134a | 100% | 100% | 100% | 100% |
| A1 | 97% | 100% | 101% | 103% |
| A2 | 97% | 100% | 101% | 103% |
| A3 | 97% | 100% | 101% | 103% |
| A4, A4' and A4" | 97% | 100% | 101% | 103% |
| A5-A8 | 97% | 100% | 102% | 103% |

Table 15 shows the performance of refrigerants in a low temperature refrigeration system. It will be understood that the results under the column with "0%" efficiency for the SL-LL HX represent a system without a SL-LL HX, and that Refrigerants A1 to A8 show improved performance in terms of efficiency (COP) than R134a when a SL/LL Heat Exchanger is employed, with composition A4, A4' and A4" showing exceptional performance when all relevant performance factors are considered.

Example 15: Electronic Cooling

Refrigerants A1 to A8 are performance tested to evaluate cooling of electronic equipment (including in the cooling of chips, electronic boards, batteries (including batteries used in cars, trucks, buses and other electronic transport vehicles), computers, and the like), including in the form of a heat pipe, a thermosiphon and the like, as well as vapor compression cooling. The analysis is carried out to assess the performance of Refrigerants A1 to A8 in these applications.

Refrigerants A1 to A8 show performance similar to R134a, with composition A4, A4' and A4" showing exceptional performance when all relevant performance factors are considered Numbered Embodiments The invention will now be illustrated by reference to the following numbered embodiments. The subject matter of the numbered embodiments may be additionally combined with subject matter from the description or from one or more of the claims.

1. A refrigerant comprising (a) from about 65% by weight to about 90% by weight of HFO-1234ze(E); and (b) from about 10% by weight to about 35% by weight of HFO-1336mzz (E).

2. The refrigerant of numbered embodiment 1, comprising (a) from about 76% by weight to about 90% by weight of HFO-1234ze(E); and (b) from about 10% by weight to about 24% by weight of HFO-1336mzz (E).

3. The refrigerant of numbered embodiment 1 or 2, comprising (a) from about 74% by weight to about 80% by weight of HFO-1234ze(E); and (b) from about 20% by weight to about 26% by weight of HFO-1336mzz (E).

4. The refrigerant of numbered embodiments 1 to 3, comprising (a) about 76.6% by weight of HFO-1234ze(E); and (b) about 19% by weight of HFO-1336mzz (E).

5. The refrigerant of any of numbered embodiments 1 to 4, consisting essentially of HFO-1234ze(E) and HFO-1336mzz (E).

6. The refrigerant of any of numbered embodiments 1 to 5, consisting of HFO-1234ze(E) and HFO-1336mzz (E).

7. A refrigerant comprising: (a) from about 74.6% by weight to about 78.6% by weight of HFO-1234ze(E); (b) from about 17% by weight to about 21% by weight of HFO-1336mzz (E); and (c) from greater than 0% to about 4.4% by weight of HFC-227ea.

8. The refrigerant of numbered embodiment 7, comprising (a) from 74.6% by weight to 78.6% by weight of HFO-1234ze(E); (b) from 17% by weight to 21% by weight of HFO-1336mzz (E); and (c) about 4.4% by weight of HFC-227ea.

9. The refrigerant of numbered embodiment 8, comprising (a) about 78.6% by weight of HFO-1234ze(E); (b) about 17% by weight of HFO-1336mzz (E); and (c) about 4.4% by weight of HFC-227ea.

10. The refrigerant of any of numbered embodiments 1 to 9, comprising about 4.4% by weight of HFC-227ea.

11. The refrigerant of any of numbered embodiments 1 to 10, consisting essentially of HFO-1234ze(E), HFO-1336mzz (E) and HFC-227ea.

12. The refrigerant of any of numbered embodiments 1 to 10, consisting of HFO-1234ze(E), HFO-1336mzz (E) and HFC-227ea.

13. The refrigerant of any of numbered embodiments 1 to 12, having a Global Warming Potential of not greater than about 150.

14. The refrigerant of any of numbered embodiments 1 to 13, wherein said refrigerant is non-flammable.

15. The refrigerant of any of numbered embodiments 1 to 14, wherein said refrigerant has no or low toxicity.

16. The refrigerant of any of numbered embodiments 1 to 15, wherein said refrigerant has a glide of less than about 3° C., preferably of less than about 2° C.

17. A heat transfer composition comprising a refrigerant according to any of numbered embodiments 1 to 16.

18. The heat transfer composition of numbered embodiment 17, comprising the refrigerant in an amount of at least about 80% by weight of the heat transfer composition, preferably at least about 90% by weight of the heat transfer composition, more preferably at least about 97% by weight of the heat transfer composition, more preferably at least about 99% by weight of the heat transfer composition.

19. The heat transfer composition of numbered embodiment 17 or 18, additionally comprising a lubricant.

20. The heat transfer composition of numbered embodiment 19, wherein the lubricant is present in the heat transfer composition in amounts of from about 1% to about 50% by weight of heat transfer composition, more preferably in amounts of from about 10% to about 50% by weight of the heat transfer composition, and most preferably about 30% to about 50% by weight of the heat transfer composition.

21. The heat transfer composition of numbered embodiments 19 or 20, wherein the lubricant is selected form the group consisting of Polyol Esters (POEs), Poly Alkylene Glycols (PAGs), PAG oils, polyvinyl ethers (PVEs), poly (alpha-olefin) (PAO) and combinations thereof.

22. The heat transfer composition of numbered embodiments 19 or 20, wherein the lubricant is a POE or PVE, preferably the lubricant is a POE.

23. A method of heating or cooling a fluid or body using a refrigerant as defined in any of numbered embodiments 1 to 16, or a heat transfer composition as defined in any of numbered embodiments 17 to 22.

24. A vapor compression system having an evaporator, a condenser and a compressor in fluid communication, comprising a refrigerant as defined in any of numbered embodiments 1 to 16, or a heat transfer composition as defined in any of numbered embodiments 17 to 23.

25. A refrigeration system comprising a refrigerant as defined in any of numbered embodiments 1 to 16, or a heat transfer composition as defined in any of numbered embodiments 17 to 23.

26. The refrigeration system of numbered embodiment 25, wherein said system is a medium temperature refrigeration system.

27. The refrigeration system of numbered embodiment 26, wherein said medium temperature refrigeration system has an evaporator temperature of from about −15° C. to about 5° C., preferably from about −10° C. to about 5° C.

28. The refrigeration system of numbered embodiment 26 or 27, wherein said medium temperature refrigeration system is selected from small refrigeration systems (including vending machines, ice machines, and appliances) commercial refrigeration systems (such as supermarket refrigeration systems and walk-in coolers), residential refrigeration systems and industrial refrigeration systems.

29. The refrigeration system of numbered embodiment 28 wherein said medium temperature refrigeration system has an evaporator temperature of from about 0° C. to about 5° C.

30. The refrigeration system of numbered embodiments 26 to 29, wherein said medium temperature refrigeration system is used to cool perishable produce, including vegetables and/or fruits, or is used to cool beverages.

31. The refrigeration system of numbered embodiments 26 to 30, wherein said medium temperature system has a condenser temperature of from about 15° C. to about 60° C., preferably from about 25° C. to about 45° C.

32. The refrigeration system of numbered embodiments 26 to 31, wherein said medium temperature system has a degree of superheat at evaporator outlet of from about 0° C. to about 10° C., preferably with a degree of superheat at evaporator outlet of from about 1° C. to about 6° C.

33. The refrigeration system of numbered embodiments 26 to 32, wherein said medium temperature system has a degree of superheat at evaporator outlet of from about 3° C. to about 5° C., preferably with a degree of superheat at evaporator outlet of about 4° C.

34. The refrigeration system of numbered embodiment 25, wherein said system is a low temperature refrigeration system.

35. The refrigeration system of numbered embodiment 34, wherein said low temperature refrigeration system has an evaporator temperature from about −45° C. to about or less than about −15° C., preferably from about −40° C. to about −25° C.

36. The refrigeration system of numbered embodiment 34 or 35, wherein said low temperature refrigeration system is selected from ice rinks, commercial freezer systems (including supermarket freezers), residential freezer systems and industrial freezer systems.

37. The refrigeration system of numbered embodiments 34 to 36, wherein said low temperature refrigeration system is used to cool frozen produce.

38. The refrigeration system of numbered embodiments 34 to 37, wherein said low temperature system has a condenser temperature from about 15° C. to about 50° C., preferably of from about 25° C. to about 45° C.

39. The refrigeration system of numbered embodiments 34 to 38, wherein said low temperature system has a degree of superheat at evaporator outlet of from about 0° C. to about 10° C., preferably of from about 1° C. to about 6° C.

40. The refrigeration system of numbered embodiment 25, wherein said system is a transport refrigeration system.

41. The refrigeration system of numbered embodiment 40, wherein said transport refrigeration system is a container capable of being transported by ship, boat, railcar, or road vehicle (e.g. truck).

42. The refrigeration system of numbered embodiment 25, wherein said system is a cascade refrigeration system.

43. The refrigeration system of numbered embodiment 42, wherein said cascade refrigeration system has an upper and a lower stage, and wherein said refrigerant as defined in any of numbered embodiments 1 to 16, or heat transfer composition as defined in any of numbered embodiments 17 to 22 is used in the upper stage.

44. The refrigeration system of numbered embodiment 43, wherein CO2, 1234yf or R455A is used in the lower stage of the cascade refrigeration system.

45. A secondary loop system comprising a refrigerant as defined in any of numbered embodiments 1 to 16, or heat transfer composition as defined in any of numbered embodiments 17 to 22.

46. The secondary loop system of numbered embodiment 45, wherein said secondary loop system contains a primary vapor compression system loop that uses a primary refrigerant and whose evaporator cools a secondary loop fluid, wherein said refrigerant as defined in any of numbered embodiments 1 to 16, or heat transfer composition as defined in any of numbered embodiments 17 to 22 is used as the secondary loop fluid.

47. The secondary loop system of numbered embodiment 46, wherein said primary refrigerant is selected form the group consisting of R404A, R507, R410A, R455A, R32, R466A, R44B, R290, R717, R452B, R448A, R1234ze(E), R1234yf and R449A.

48. A heat pump system comprising a refrigerant as defined in any of numbered embodiments 1 to 16, or heat transfer composition as defined in any of numbered embodiments 17 to 22.

49. The heat pump system of numbered embodiment 48, wherein said heat pump is a heat pump tumble drier, reversible heat pump, high temperature heat pump or air-to-air heat pump.

50. An air conditioning system comprising a refrigerant as defined in any of numbered embodiments 1 to 16, or heat transfer composition as defined in any of numbered embodiments 17 to 22.

51. The air conditioning system of numbered embodiment 50, wherein said system is selected from chillers, residential, industrial, commercial, and mobile air-conditioning.

52. The air conditioning system of numbered embodiment 51, wherein said mobile air conditioning system includes air conditioning of road vehicles such as automobiles, trucks and buses, as well as air conditioning of boats, and trains.

53. The system of any of numbered embodiments 24 to 52, wherein said system comprises a suction line, liquid line heat exchanger.

54. An organic ranking cycle system comprising a refrigerant as defined in any of numbered embodiments 1 to 16, or heat transfer composition as defined in any of numbered embodiments 17 to 22.

55. A method for cooling a fluid or body using a refrigeration system, said method comprising the steps of (a) evaporating a refrigerant as defined in any of numbered embodiments 1 to 16 in the vicinity of the fluid of body or be cooled, and (b) condensing said refrigerant.

56. The method of numbered embodiment 55, wherein said refrigeration system is a medium temperature refrigeration system.

57. The method of numbered embodiment 56, wherein said medium temperature refrigeration system is as defined in any of numbered embodiments 26 to 33.

58. The method of numbered embodiment 55, wherein said refrigeration system is a low temperature refrigeration system.

59. The method of numbered embodiment 58, wherein said medium temperature refrigeration system is as defined in any of numbered embodiments 34 to 39.

60. The method of numbered embodiment 55, wherein said refrigeration system is a transport refrigeration system.

61. The method of numbered embodiment 60, wherein said transport refrigeration system is as defined in numbered embodiment 40.

62. The method of numbered embodiment 55, wherein said refrigeration system is a cascade refrigeration system.

63. The method of numbered embodiment 62 wherein said cascade refrigeration system is as defined in any of numbered embodiments 42 to 44.

64. A method for cooling a fluid or body using a secondary loop system, said method comprising the steps of (a) evaporating a primary refrigerant in the vicinity of a secondary loop fluid and transferring heat from said secondary loop fluid to said primary refrigerant (b) condensing said primary refrigerant, and (c) circulating said secondary loop fluid through a secondary loop, thereby absorbing heat from said fluid or body to be cooled, wherein secondary loop fluid is a refrigerant as defined in any of numbered embodiments 1 to 16, or heat transfer composition as defined in any of numbered embodiments 17 to 22.

65. The method of numbered embodiment 64, wherein said primary refrigerant is selected form the group consisting of R404A, R507, R410A, R455A, R32, R466A, R44B, R290, R717, R452B, R448A, R1234ze(E), R1234yf and R449A.

66. A method of heating a fluid or body using a heat pump, said method comprising the steps of (a) condensing a refrigerant as defined in any of numbered embodiments 1 to 16 in the vicinity of the fluid of body or be heated, and (b) evaporating said refrigerant.

67. The method of numbered embodiment 66, wherein said heat pump is a heat pumps tumble drier, a reversible heat pump, a high temperature heat pump or an air-to-air heat pump.

68. A method of air conditioning using an air conditioning system, said method comprising the steps of (a) evaporating a refrigerant as defined in any of numbered embodiments 1 to 16 in the vicinity of a fluid of body or be cooled, and (b) condensing said refrigerant.

69. The method of numbered embodiment 68, wherein said system is as defined in any of numbered embodiments 50 to 52.

70. A process for converting thermal energy to mechanical energy in a Rankine cycle, the method comprising the steps of i) vaporizing a working fluid with a heat source and expanding the resulting vapor, or vaporizing a working fluid with a heat source, then ii) cooling the working fluid with a heat sink to condense the vapor, wherein the working fluid is a refrigerant as defined in any of numbered embodiments 1 to 16, or heat transfer composition as defined in any of numbered embodiments 17 to 22.

71. The process of numbered embodiment 70, wherein said heat source is provided by a low grade thermal energy source selected from industrial waste heat, solar energy, geothermal hot water, low pressure steam, distributed power generation equipment utilizing fuel cells, or prime movers.

72. The process of numbered embodiment 70 or 71, wherein the heat source is provided by turbines, micro turbines or an internal combustion engine.

73. The process of numbered embodiment 72 wherein the low pressure steam is a low pressure geothermal steam or is provided by a fossil fuel powered electrical generating power plant.

74. The process of numbered embodiments 70 to 73, wherein said heat source temperatures is from about 80° C. to about 800° C., or above.

75. A heat transfer system for cooling of electronic equipment comprising a refrigerant as defined in any of numbered embodiments 1 to 16, or a heat transfer composition as defined in any of numbered embodiments 17 to 23.

76. The heat transfer system of claim 75 used for the cooling of one or more of electronic chips, electronic boards, batteries (including batteries used in cars, trucks, buses and other electronic transport vehicles), computers, and the like.

77. The heat transfer system of according to any of claim 75 and claim 76 including in the form of a heat pipe or a thermosiphon.

What is claimed is:

1. A secondary loop heat transfer system comprising:
   (a) a primary vapor compression system comprising a primary refrigerant in an evaporator in said primary vapor compression system; and
   (b) a secondary vapor compression system comprising a secondary refrigerant that is cooled by said primary refrigerant, said secondary refrigerant consisting essentially of:
      (i) from 76.6% by weight to about 78.6% by weight of HFO-1234ze(E); and
      (ii) from 17% by weight to about 19% by weight of HFO-1336mzz (E); and
      (iii) about 4.4% by weight of HFC-227ea, wherein said refrigerant has a GWP of less than about 150 and is non-flammable.

2. The secondary loop heat transfer system of claim 1 wherein said secondary vapor compression system comprises an evaporator containing at least a portion of said secondary refrigerant, wherein said secondary refrigerant has an evaporator glide of less than about 3.0° C.

3. The secondary loop heat transfer system of claim 2 wherein said primary refrigerant comprises one or more of R404A, R507, R410A, R455A, R32, R466A, R44B, R290, R717, R452B, R448A, R1234ze(E), R1234yf, and R449A.

4. The secondary loop heat transfer system of claim 2 wherein the operating pressure of the secondary refrigerant in said evaporator is not below atmospheric pressure.

5. The secondary loop heat transfer system of claim 1 wherein said primary refrigerant comprises one or more of R404A, R507, R410A, R455A, R32, R466A, R44B, R290, R717, R452B, R448A, R1234ze(E), R1234yf, and R449A.

6. The secondary loop heat transfer system of claim 5 wherein said secondary refrigerant consists of: (a) about 78.6% by weight of HFO-1234ze(E); (b) about 17% by weight of HFO-1336mzz (E); and (c) about 4.4% by weight of HFC-227ea.

7. The secondary loop heat transfer system of claim 5 wherein said secondary refrigerant consists of said HFO-1234ze(E), said HFO-1336mzz (E), and said HFC-227ea.

8. The secondary loop heat transfer system of claim 1 wherein said secondary refrigerant consists of said HFO-1234ze(E), said HFO-1336mzz (E), and said HFC-227ea.

9. The secondary loop heat transfer system of claim 1 wherein said secondary refrigerant consists of: (a) about 78.6% by weight of HFO-1234ze(E); (b) about 17% by weight of HFO-1336mzz (E); and (c) about 4.4% by weight of HFC-227ea.

10. The secondary loop heat transfer system of claim 1 wherein said secondary refrigerant consists of: (a) about 76.6% by weight of HFO-1234ze(E); (b) about 19% by weight of HFO-1336mzz (E); and (c) about 4.4% by weight of HFC-227ea.

11. The secondary loop heat transfer system of claim 1 wherein said secondary refrigerant consists of: (a) 78.6%+ 0.5%/−2.0% by weight of HFO-1234ze(E); (b) 17%+2.0%/− 0.5% by weight of HFO-1336mzz (E); and (c) about 4.4%+ 2.0%/−0.5% by weight of HFC-227ea.

12. The secondary loop heat transfer system of claim 1 wherein said secondary refrigerant consists of: (a) 76.6%+ 0.5%/−2.0% by weight of HFO-1234ze(E); (b) 19%+2.0%/− 0.5% by weight of HFO-1336mzz (E); and
   (c) about 4.4%+2.0%/−0.5% by weight of HFC-227ea.

13. A chiller system or a medium temperature refrigeration system comprising the secondary loop heat transfer system of claim 1.

14. The secondary loop heat transfer system of claim 2 wherein said secondary refrigerant has an evaporator temperature in the range of from about −5° C. to 10° C.

15. An air conditioning system comprising the secondary loop heat transfer system of claim 14.

16. The secondary loop heat transfer system of claim 1 wherein said secondary vapor compression system further comprises a compressor and lubricant for said compressor, wherein said lubricant comprises a POE lubricant and/or a PVE lubricant for said compressor.

17. The secondary loop heat transfer system of claim 16 wherein said secondary refrigerant consists essentially of: (a) 78.6%+0.5%/−2.0% by weight of HFO-1234ze(E); (b) 17%+2.0%/−0.5% by weight of HFO-1336mzz (E); and (c) about 4.4%+2.0%/−0.5% by weight of HFC-227ea.

18. The secondary loop heat transfer system of claim 16 wherein said secondary refrigerant consists of said HFO-1234ze(E), said HFO-1336mzz (E), and said HFC-227ea.

19. The secondary loop heat transfer system of claim 17 wherein said wherein said lubricant comprises a POE lubricant.

20. The secondary loop heat transfer system of claim 17 wherein said wherein said lubricant comprises a PVE lubricant.

* * * * *